United States Patent
Ishii et al.

(10) Patent No.: US 9,893,377 B2
(45) Date of Patent: Feb. 13, 2018

(54) NONAQUEOUS ELECTROLYTE BATTERY, BATTERY PACK AND VEHICLE

(75) Inventors: Haruchika Ishii, Saku (JP); Toshihide Arikawa, Komoro (JP); Hirotada Tahara, Saku (JP); Masataka Shikota, Takasaki (JP); Kazuko Takanezawa, Saku (JP); Hiroki Inagaki, Kawasaki (JP); Yuichi Kikuma, Takasaki (JP); Yoshiaki Asami, Niiza (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 585 days.

(21) Appl. No.: 12/888,889

(22) Filed: Sep. 23, 2010

(65) Prior Publication Data

US 2011/0076557 A1 Mar. 31, 2011

(30) Foreign Application Priority Data

Sep. 25, 2009 (JP) ................. 2009-221305

(51) Int. Cl.
*H01M 10/0525* (2010.01)
*H01M 10/0566* (2010.01)
(Continued)

(52) U.S. Cl.
CPC ....... *H01M 10/0525* (2013.01); *B60L 3/0046* (2013.01); *B60L 11/126* (2013.01); *B60L 11/14* (2013.01); *B60L 11/1872* (2013.01); *B60L 11/1877* (2013.01); *B60L 11/1879* (2013.01); *H01M 4/131* (2013.01); *H01M 4/133* (2013.01); *H01M 4/136* (2013.01); *H01M 4/485* (2013.01); *H01M 4/505* (2013.01); *H01M 4/525* (2013.01); *H01M 4/581* (2013.01); *H01M 4/587* (2013.01);
(Continued)

(58) Field of Classification Search
CPC .......... H01M 4/04–4/0469; H01M 4/36–4/54; H01M 10/05–10/0569
See application file for complete search history.

(56) References Cited

U.S. PATENT DOCUMENTS 6,326,104 B1 * 12/2001 Caja et al. .............. 429/188
2005/0233219 A1 10/2005 Gozdz et al.
(Continued)

FOREIGN PATENT DOCUMENTS

EP   1 518 287 B1   5/2008
JP   10-69922       3/1998
(Continued)

OTHER PUBLICATIONS

Partial European Search Report dated Dec. 6, 2010, in European Patent Application No. 10179350.3.
(Continued)

*Primary Examiner* — Jonathan Crepeau
*Assistant Examiner* — Jacob Buchanan
(74) *Attorney, Agent, or Firm* — Oblon, McClelland, Maier & Neustadt, L.L.P.

(57) ABSTRACT

According to one embodiment, there is provided a nonaqueous electrolyte battery. The negative electrode of the battery includes a negative electrode active material which can absorb and release lithium ions at a negative electrode potential of 0.4 V (V.S. Li/Li$^+$) or more. The battery satisfying the following equations (I) and (II):

$$1 \leq Q2/Q1 \qquad (I)$$

$$0.5 \leq C/A \leq 0.999 \qquad (II)$$

20 Claims, 14 Drawing Sheets

(51) Int. Cl.

| | | |
|---|---|---|
| H01M 4/131 | (2010.01) | |
| H01M 4/525 | (2010.01) | |
| H01M 4/505 | (2010.01) | |
| B60L 3/00 | (2006.01) | |
| B60L 11/12 | (2006.01) | |
| B60L 11/14 | (2006.01) | |
| B60L 11/18 | (2006.01) | |
| H01M 4/133 | (2010.01) | |
| H01M 4/136 | (2010.01) | |
| H01M 4/485 | (2010.01) | |
| H01M 4/58 | (2010.01) | |
| H01M 4/587 | (2010.01) | |
| H01M 4/02 | (2006.01) | |
| H01M 10/42 | (2006.01) | |

(52) U.S. Cl.
CPC ....... *H01M 4/5815* (2013.01); *H01M 4/5825* (2013.01); *H01M 10/0566* (2013.01); *B60L 2210/40* (2013.01); *B60L 2240/545* (2013.01); *B60L 2240/547* (2013.01); *B60L 2240/549* (2013.01); *H01M 2004/021* (2013.01); *H01M 2004/027* (2013.01); *H01M 2004/028* (2013.01); *H01M 2010/4292* (2013.01); *H01M 2300/0025* (2013.01); *Y02E 60/122* (2013.01); *Y02T 10/6217* (2013.01); *Y02T 10/705* (2013.01); *Y02T 10/7011* (2013.01); *Y02T 10/7077* (2013.01); *Y02T 10/7241* (2013.01)

(56) References Cited

U.S. PATENT DOCUMENTS

| | | | | |
|---|---|---|---|---|
| 2006/0147795 | A1* | 7/2006 | Li et al. | ............ 429/209 |
| 2006/0216600 | A1 | 9/2006 | Inagaki et al. | |
| 2007/0009798 | A1* | 1/2007 | Inagaki et al. | ............ 429/231.1 |
| 2009/0081534 | A1 | 3/2009 | Takami et al. | |
| 2010/0171466 | A1* | 7/2010 | Spitler et al. | ............ 320/134 |

FOREIGN PATENT DOCUMENTS

| | | |
|---|---|---|
| JP | 2000-12090 | 1/2000 |
| JP | 2000-228224 A | 8/2000 |
| JP | 2004-119199 | 4/2004 |
| JP | 2004-171955 | 6/2004 |
| JP | 2004-227931 A | 8/2004 |
| JP | 2007-48662 | 2/2007 |
| JP | 2007-95496 | 4/2007 |
| JP | 2008-84689 | 4/2008 |
| JP | 2009-129644 | 6/2009 |
| JP | 2009-221305 | 10/2009 |
| KR | 10-2006-0103199 | 9/2006 |
| KR | 10-2007-0085860 | 8/2007 |
| WO | 2006/026585 A2 | 3/2006 |
| WO | 2006/026585 A3 | 3/2006 |

OTHER PUBLICATIONS

Korean Office Action dated May 25, 2012, in Korea Patent Application No. 10-2010-92894 (with English Translation).

Office Action dated Oct. 1, 2013 in Japanese Application No. 2010-215838 (w/English translation).

Extended European Search Report dated May 16, 2014 in Patent Application No. 10179350.3.

Denis Y. W. Yu et al., Effect of Electrode Parameters on $LiFePO_4$ Cathodes; Journal of the Electrochemical Society, 153 (5) A835-A839 (2006).

Y.-H. Chen et al., Porous cathode optimization for lithium cells: Ionic and electronic conductivity capacity, and selection of materials; Journal of Power Sources 195 (2010) 2851-2862.

Honghe Zheng et al.; Calendering effects on the physical and electrochemical properties of Li $[Ni_{1/3}Mn_{1/3}Co_{1/3}]O_2$ Cathode; Journal of Power Sources 208 (2012) 52-57.

Honghe Zheng et al.; A comprehensive understanding of electrode thickness effects on the electrochemical performances of Li-ion battery cathodes; Electrochimica Acta 71 (2012) 258-265.

Excerpt from "Lithium-Ion Batteries Fundamentals and Applications", Edited by Yuping Wu, CRC Press, ISBN: 978-1-4665-5733-8; 4 pages.

Partial translation of "Battery Handbook", Edited by The Committee of Battery Technology, The Electrochemistry Association Battery of Japan, Ohmsha Ltd., published Feb. 10, 2010, ISBN: 978-4-274-20805-8.

Zhao-Rong Chang, et al, "Synthesis and characterization of high-density LiFePO4/C composites as cathode materials for lithium-ion batteries," Electrochimica Acta 54 (2009) pp. 4595-4599; www.elsevier.com/locate/electacta.

Claus Daniel, "Materials and Processing for Lithium-Ion Batteries," JOM—The Minerals, Metals & Materials Society (TMS), Sep. 2008, vol. 60, No. o. pp. 43-48; www.tms.org.jom.html.

* cited by examiner

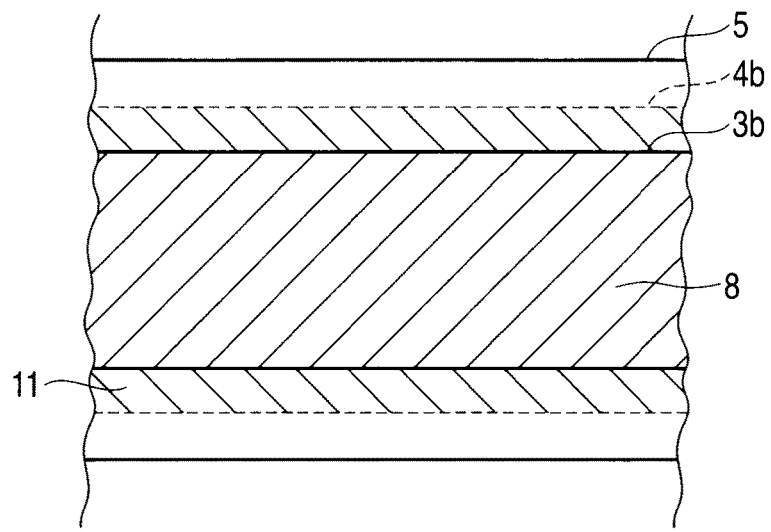
F I G. 3
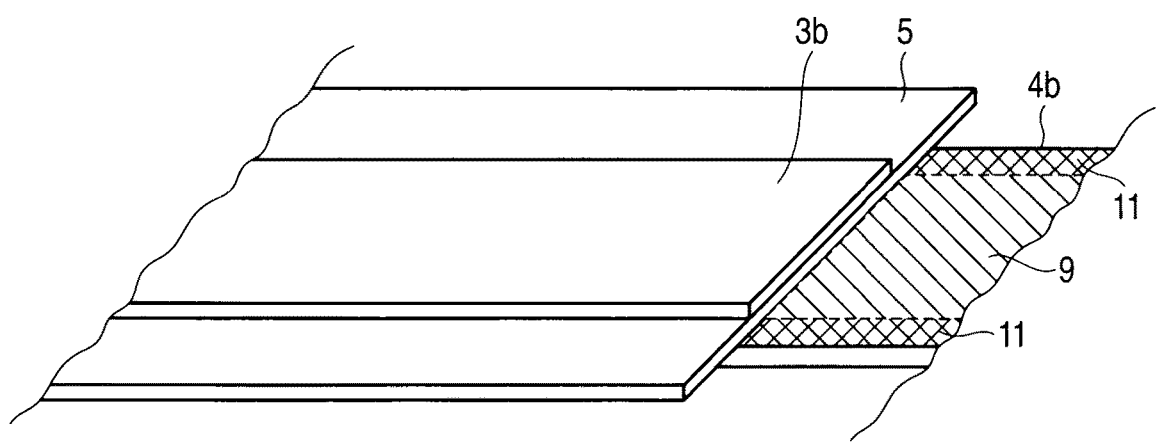
F I G. 4

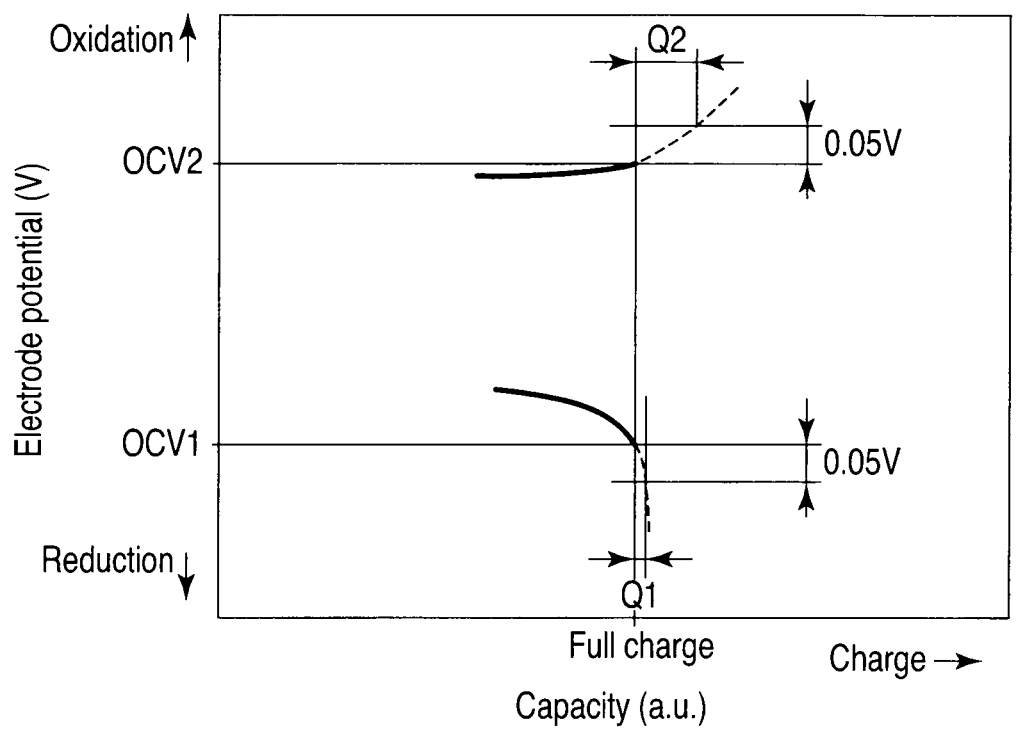
F I G. 5
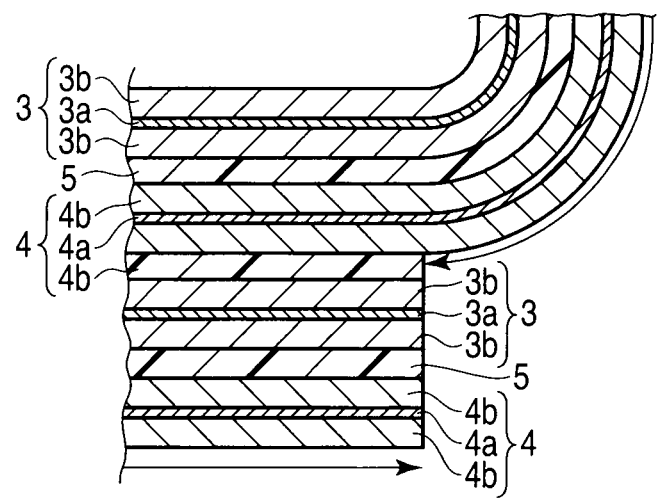
F I G. 6

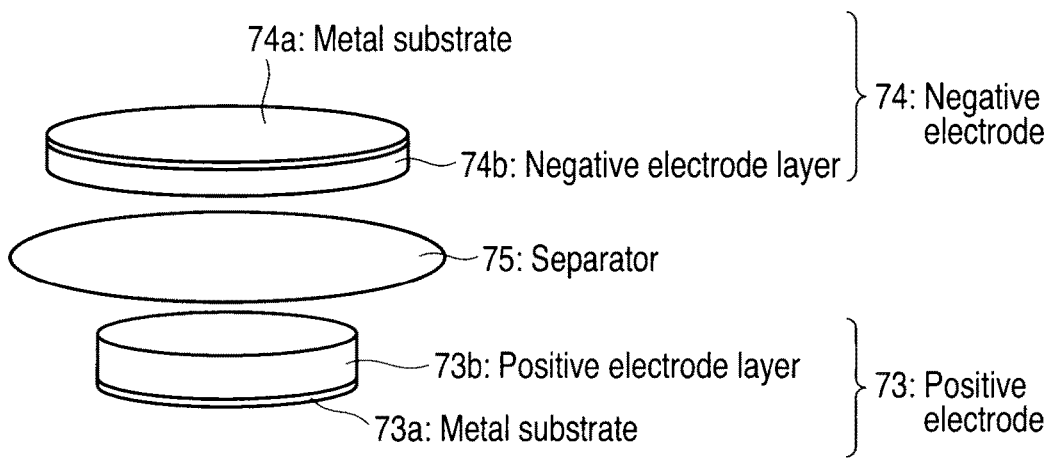
F I G. 10A
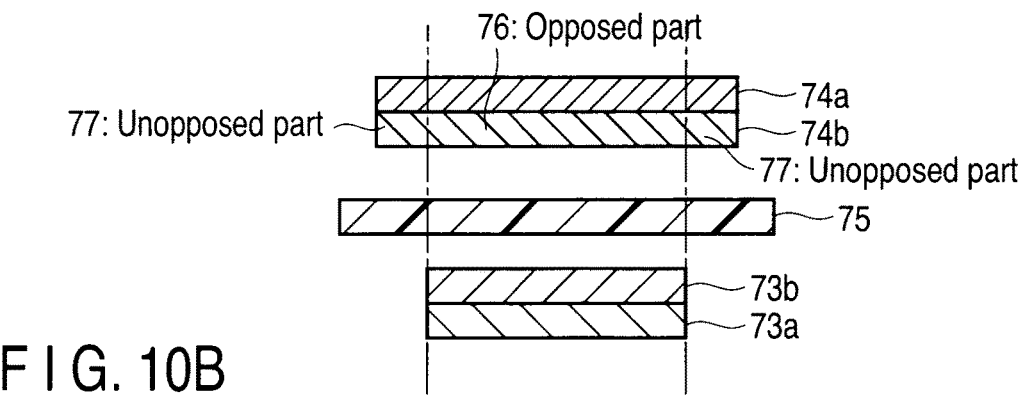
F I G. 10B
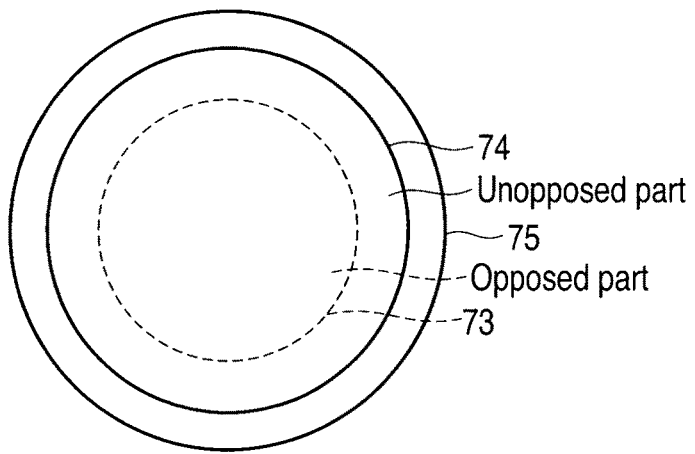
F I G. 10C

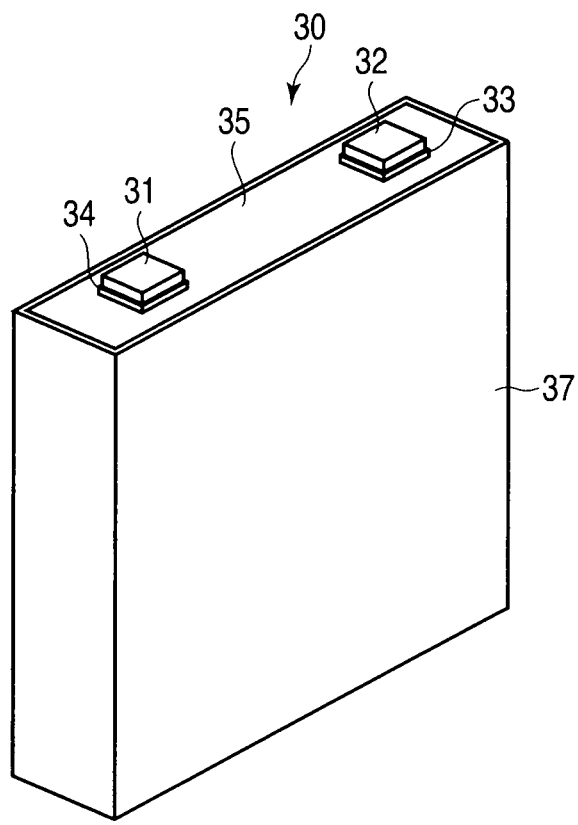
F I G. 13
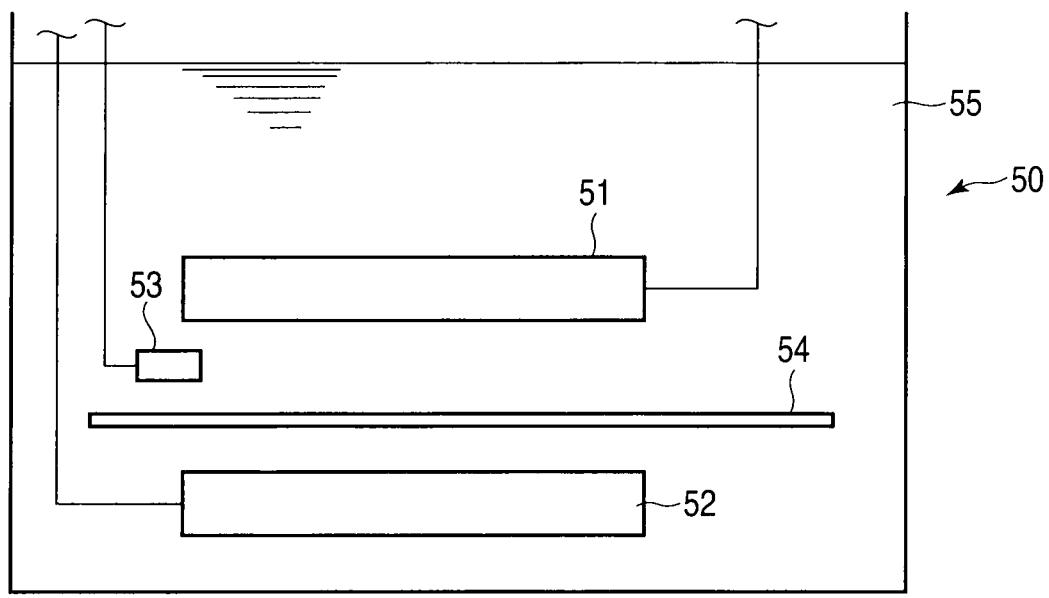
F I G. 20

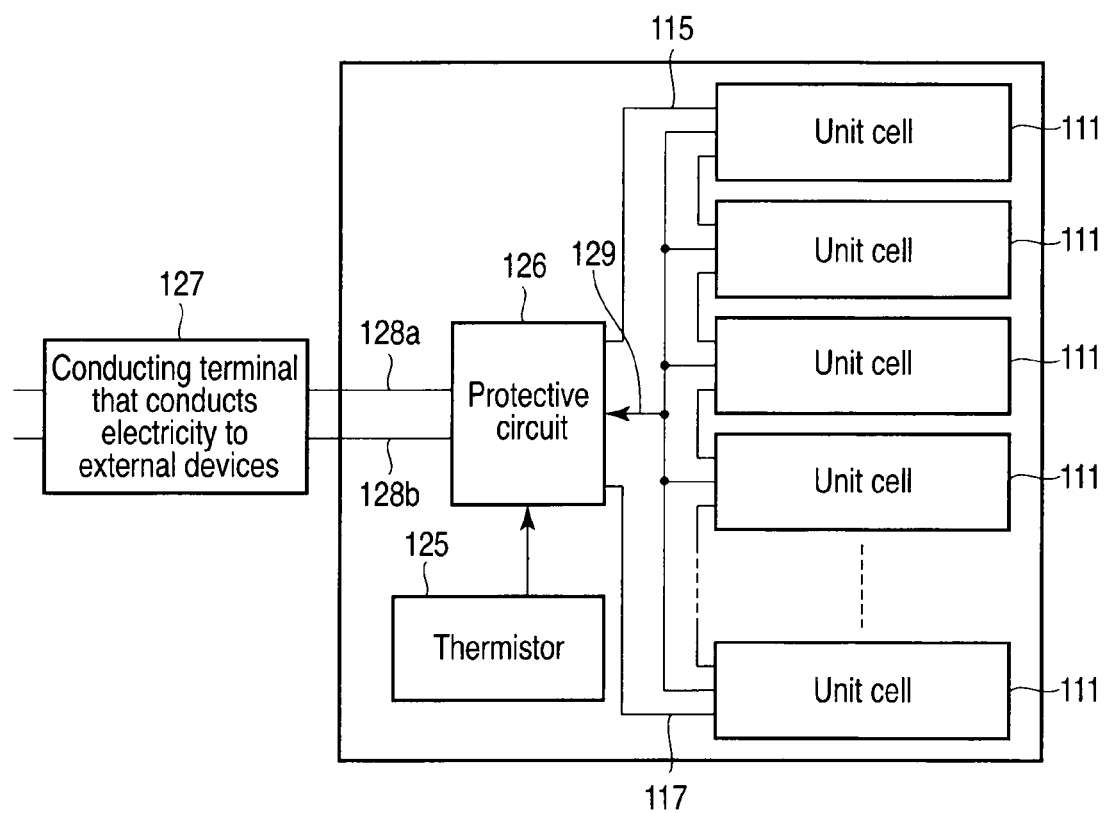
F I G. 15

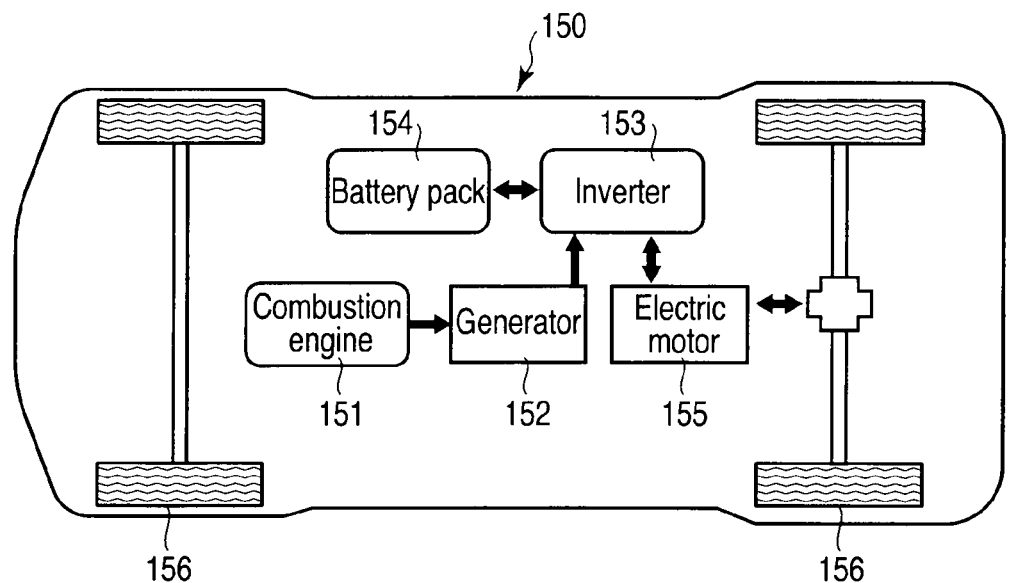
F I G. 16
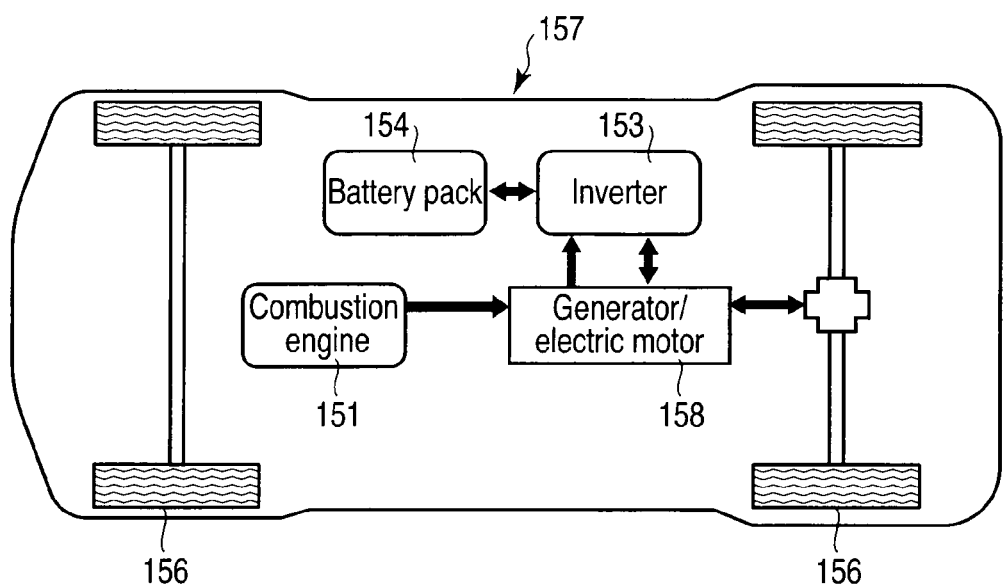
F I G. 17

NONAQUEOUS ELECTROLYTE BATTERY, BATTERY PACK AND VEHICLE

CROSS-REFERENCE TO RELATED APPLICATIONS

This application is based upon and claims the benefit of priority from Japanese Patent Application No. 2009-221305, filed Sep. 25, 2009; the entire contents of which are incorporated herein by reference.

FIELD

Embodiments described herein relate generally to a nonaqueous electrolyte battery, battery pack and vehicle.

BACKGROUND

Lithium ion batteries which can be utilized as the motive power for vehicles have been enthusiastically developed in recent years. Particularly, batteries using, in a negative electrode, an active material which has a high potential typified by lithium-titanium composite oxide are superior to batteries using a carbon negative electrode in life characteristics, safety and rapid chargeability. Batteries using such a lithium-titanium composite oxide are also expected to have longer life.

JP-A 10-69922 (KOKAI) discloses a nonaqueous electrolyte lithium secondary battery which is improved in over-discharge resistance and over-charge resistance by using, in the negative electrode, a lithium-titanium oxide having high stability in a wide potential range and also, by making the capacity of the negative electrode smaller than that of the positive electrode. The above nonaqueous electrolyte lithium secondary battery is further developed into a battery disclosed in JP-A 2000-12090 (KOKAI) in which the ratio of the actual capacity of the negative electrode to that of the positive electrode is designed to be 0.8 or less. However, a battery having the structure disclosed in the above document has the problem concerning a shorter cycle life.

BRIEF DESCRIPTION OF THE DRAWINGS

FIG. 3 is a plan view of a part excerpted from the electrode;

FIG. 4 is a perspective view of a part excerpted from the electrode;

FIG. 5 is a schematic view of a curve of the potentials of positive and negative electrodes in the end period of charging step;

FIG. 6 is a magnified schematic view of a wound ending part of a wound electrode group;

FIG. 10A is a developed view of a coin type electrode group;

FIG. 10B is an exploded sectional view of a coin type electrode group;

FIG. 10C is a plan view of a coin type electrode group;

FIG. 13 is an oblique view showing an outward appearance of an angular type nonaqueous electrolyte battery;

FIG. 15 is a block diagram showing an electric circuit of a battery pack according to the third embodiment;

FIG. 16 is a schematic view showing a series hybrid vehicle according to a fourth embodiment;

FIG. 17 is a schematic view of a parallel hybrid vehicle according to the fourth embodiment;

FIG. 20 is a schematic view of a measuring cell.

DETAILED DESCRIPTION

Figure 1:
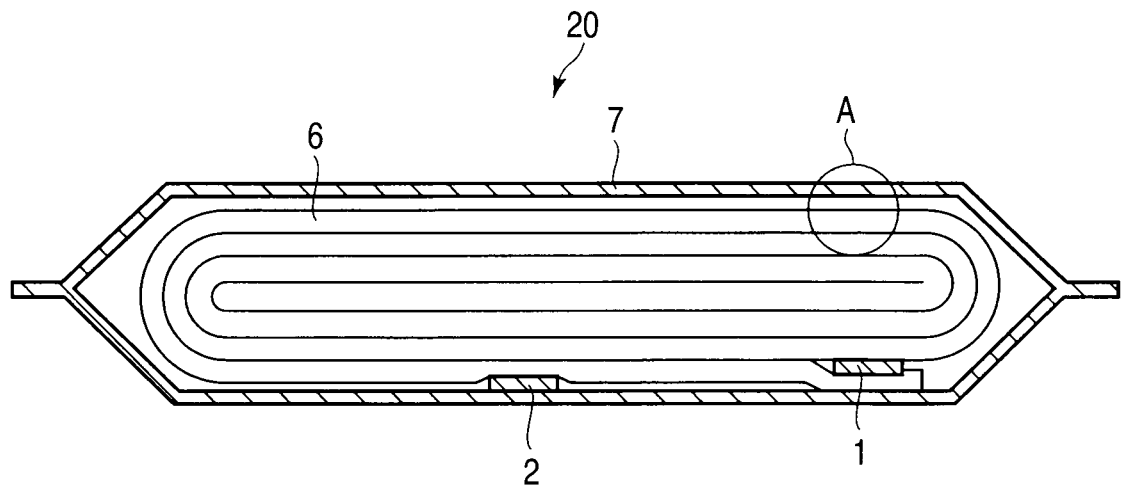
FIG. 1 is a schematic cross section of a flat nonaqueous electrolyte battery according to a first embodiment.

It is an object of embodiments to provide a nonaqueous electrolyte battery improved in cycle life, a battery pack comprising the battery, and a vehicle comprising the battery pack.

In general, according to one embodiment, there is provided a nonaqueous electrolyte battery comprising a positive electrode, a negative electrode, a separator, and a nonaqueous electrolyte. The positive electrode comprises a positive electrode layer formed on at least one surface of a positive electrode current collector. The negative electrode comprises a negative electrode layer formed on at least one surface of a negative electrode current collector. The separator is interposed between the positive electrode and the negative electrode. The negative electrode layer comprises a negative electrode active material which can absorb and release lithium ions at a negative electrode potential of 0.4 V (V.S. Li/Li$^+$) or more. The nonaqueous electrolyte battery satisfies the following equations (I) and (II):

$$1 \leq Q2/Q1 \quad (I)$$

$$0.5 \leq C/A \leq 0.999 \quad (II)$$

wherein a part of the negative electrode layer opposed to the positive electrode through the separator is a negative electrode opposed part, and a part of the positive electrode layer opposed to the negative electrode through the separator is a positive electrode opposed part, Q1 is an increment of capacity at the negative electrode opposed part when the negative electrode opposed part which is fully charged is applied a potential shifted to a reducing side by 0.05 V from an open circuit voltage OCV1 between the negative electrode opposed part and metal lithium, Q2 is an increment of capacity at the positive electrode opposed part when the positive electrode opposed part which is fully charged is applied a potential shifted to an oxidizing side by 0.05 V from the open circuit voltage OCV2 between the positive electrode opposed part and metal lithium, A is an area of an opposed region comprising the negative electrode opposed part and unopposed part of the negative electrode layer, and C is an area of an opposed region comprising the positive electrode opposed part and unopposed part of the positive electrode layer.

The open circuit voltage OCV1 means difference between a potential of the negative electrode opposed part and a potential of metal lithium. The open circuit voltage OCV2 means difference between a potential of the positive electrode opposed part and a potential of metal lithium.

Further, according to the embodiment, there is provided a nonaqueous electrolyte battery comprising a positive electrode, a negative electrode, a separator, and a nonaqueous electrolyte. The positive electrode comprises a positive electrode layer formed on at least one surface of a positive electrode current collector. The negative electrode comprises a negative electrode layer formed on at least one surface of a negative electrode current collector. The separator is interposed between the positive electrode and the negative electrode. The negative electrode layer comprises a negative electrode active material which can absorb and release lithium ions at a negative electrode potential of 0.4 V (V.S. Li/Li$^+$) or more. The nonaqueous electrolyte battery satisfies the following equations (III) and (IV):

$$1 \leq Q4/Q3 \quad \text{(III)}$$

$$0.5 \leq C/A \leq 0.999 \quad \text{(IV)}$$

wherein a part of the negative electrode layer opposed to the positive electrode through the separator is a negative electrode opposed part, and a part of the positive electrode layer opposed to the negative electrode through the separator is a positive electrode opposed part, Q3 is a decrement of capacity at the negative electrode opposed part when the negative electrode opposed part which is fully discharged is applied a potential shifted to an oxidizing side by 0.05 V from an open circuit voltage OCV3 between the negative electrode opposed part and metal lithium, Q4 is a decrement of capacity at the positive electrode opposed part when the positive electrode opposed part which is fully discharged is applied a potential shifted to a reducing side by 0.05 V from the open circuit voltage OCV4 between the positive electrode opposed part and metal lithium, A is an area of an opposed region comprising the negative electrode opposed part and unopposed part of the negative electrode layer, and C is an area of an opposed region comprising the positive electrode opposed part and unopposed part of the positive electrode layer.

The open circuit voltage OCV3 means difference between a potential of the negative electrode opposed part and a potential of metal lithium. The open circuit voltage OCV4 means difference between a potential of the positive electrode opposed part and a potential of metal lithium.

The inventors of the present invention experimentally produced a battery having the structure of the Example 1 described in JP-A 10-69922 (KOKAI) to measure the cycle life of the battery. In this battery, $LiMn_{2-x}M_xO_4$, $LiCo_{1-y}M_yO_2$, $LiNi_{1-y}M_yO_2$, $LiNi_{0.5-z}Mn_{1.5-a}M_{z+a}O_4$, $LiMPO_4$ or $LiFe_{1-y}M_yPO_4$ was used as the positive electrode active material. In the above, $0 \leq x < 2$, $0 \leq y < 1$, $0 \leq z < 0.5$, $0 \leq a < 1.5$, M is a typical metal or a transition metal. A slurry comprising the positive electrode active material was prepared, applied to a current collector and dried, followed by pressing to manufacture a positive electrode. The negative electrode was also manufactured in the same manner as above.

As a result of the measurement, it was found that the experimentally produced battery was largely reduced in capacity during the 10000 cycles which is the cycles number required for the battery of vehicles. It was therefore clarified that a battery having the structure shown in the Example 1 described in JP-A 10-69922 (KOKAI) had a short cycle life.

A cell having the same structure as that of the Example 2 described in JP-A 10-69922 (KOKAI) was experimentally produced using a positive electrode and negative electrode as mentioned above to measure the cycle life of the cell. As a result of the measurement of the experimentally manufactured cell, the elution of the positive electrode was observed, self-discharge was increased and short circuits were frequently occurred when the charge-discharge cycle was repeated in an environment of 50° C. at which a battery for vehicles was applied. Therefore, it was clarified that a battery having the structure shown in the Example 2 described in JP-A 10-69922 (KOKAI) also had a short cycle life.

The inventors of the present invention have made earnest studies and as a result, found that in the case of batteries manufactured based on the structures of the Examples 1 and 2 described in JP-A 10-69922 (KOKAI), a reduction in cycle life is caused due to the following two reasons.

(1) When the area of the negative electrode is too large compared to the area of the positive electrode, lithium ions are accumulated in a part of the negative electrode which is not opposed to the positive electrode in a charge-discharge cycle. This brings about the accumulation of lithium ions in the negative electrode. The accumulated lithium ions do not participate in a charge-discharge operation, resulting in the failure of protection of over-charge of the positive electrode. As a result, the capacity of the positive electrode is reduced and the cycle life of the battery is shortened.

(2) When the area of the positive electrode is the same as or larger than the area of the negative electrode, the positive electrode is eluted by HF in a high-temperature environment (for example, 50° C. or more). This causes the breakage of the separator, so that short circuits are occurred. As a result, the life of the battery is shortened.

Detailed examinations will be made as to the above (1).

The electroconductivity of an electrolyte in a nonaqueous electrolyte is lower than that of the electrolyte in an aqueous solution. Therefore, it is generally known that when a battery is charged and discharged under a constant current, only the part opposed to a counter electrode contributes to charge and discharge, whereas when a battery is charged and discharged at a constant voltage, the part which is not opposed to a counter electrode also contributes to a battery reaction.

Generally, a lithium ion battery is charged at constant voltage after being charged under constant current (CC-CV charge) and discharged under constant current (CC discharge). Lithium ions are released and inserted mainly at a part where both electrodes are opposed to each other when a battery is charged and discharged under constant current. On the other hand, lithium ions released from the positive electrode are also inserted into the part of the negative electrode which is not opposed to the positive electrode when a battery is charged at constant voltage.

The lithium ions inserted into the part of the negative electrode opposed to the positive electrode are released.

However, the lithium ions inserted into the part of the negative electrode which is not opposed to the positive electrode are not released because the battery is discharged under constant current. Accordingly, when a charge and discharge cycle is repeated, lithium ions which do not participate in charge-discharge operations are accumulated in the negative electrode, resulting in the failure of protection of over-charge of the positive electrode.

The positive electrode can be over-charged as mentioned above, even if the capacity of the negative electrode is larger than that of the positive electrode. Therefore, the positive electrode cannot be adequately protected only by limiting the capacities of the positive and negative electrodes.

In the case of the battery of the Example 1 described in JP-A 10-69922 (KOKAI), the ratio of substantial reversible capacities of the positive and negative electrodes (i.e. reversible capacity of the positive electrode/reversible capacity of the negative electrode) is 1.8 to 2.7, showing that the reversible capacity of the positive electrode is 1.8 times that of the negative electrode. However, in the structure according to the Example 1 described in JP-A 10-69922 (KOKAI), the ratio (C/A) of the area (C) of the region comprising a positive electrode part opposed to the negative electrode to the area (A) of the region comprising a negative electrode part opposed to the positive electrode is about 0.444, showing that the area of the negative electrode is remarkably larger. Accordingly, the capacities of the positive electrode and negative electrode in JP-A 10-69922 (KOKAI) include the capacity of a part where the positive electrode and the negative electrode are not opposed to each other through a separator and therefore, the positive electrode potential is increased to the level of over-charge in actual charge-discharge cycles, resulting in a large reduction in battery capacity.

In the Example 1 in JP-A 10-69922 (KOKAI), when the battery is manufactured, metal lithium is contact with the negative electrode in advance and lithium ions are inserted into the negative electrode electrochemically. It is considered that a large reduction in battery capacity does not occur because a no-charge area does not exist in the negative electrode. In other words, it may be said that it is necessary to put the negative electrode into a charged state in advance in the battery having the structure of the Example 1 in JP-A 10-69922 (KOKAI).

A large reduction in battery capacity does not occur in a battery using a carbon negative electrode. The carbon negative electrode has a small potential change according to capacity change in the end period of charging step. Therefore, the charging of the battery is controlled based on a rise in the potential of the positive electrode. Moreover, because the area of the positive electrode is designed to be larger than the area of the negative electrode, the positive electrode is not over-charged in theory.

Next, more detailed examinations will be made as to the above (2).

In the battery having the structure disclosed in the Example 2 described in JP-A 10-69922 (KOKAI), the area (C) of the region comprising the part of the positive electrode opposed to the negative electrode is equal to the area (A) of the region comprising the part of the negative electrode opposed to the positive electrode, and the phenomenon of the above (1) does not occur.

However, it has been clarified that when the area (C) of the positive electrode is equal to or larger than the area (A) of the negative electrode, that is, in the case where the positive electrode has a part which is not opposed to the negative electrode, the positive electrode is eluted during storage at a high temperature (i.e. 50° C. or more).

In a lithium ion battery, in general, a fluoride based electrolyte is used. A fluoride based electrolyte is decomposed to generate HF, which has such a nature that it dissolves metal oxides. It is therefore considered that the elution of the positive electrode is caused by HF. The production rate of HF is increased as the temperature rises and therefore, an environment of a temperature as high as 50° C. or more brings about the problem concerning the elution of the positive electrode.

Generally, HF is reduced by self-discharge of the negative electrode as shown in the following equations (V), (VI) and (VII) and is therefore not left in the battery.

$$2e^- + 2HF \rightarrow H_2 + 2F^- \qquad (V)$$

$$LiC_6 \rightarrow Li^+ + C_6 + e^- \qquad (VI)$$

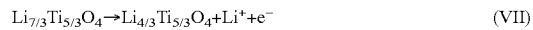
$$Li_{7/3}Ti_{5/3}O_4 \rightarrow Li_{4/3}Ti_{5/3}O_4 + Li^+ + e^- \qquad (VII)$$

It is however considered that the elution of the positive electrode is caused by HF because of the following factors A and B in the structure according to the Example 2 described in JP-A 10-69922 (KOKAI).

Factor A: HF is not reduced at a site distant from the negative electrode but left unremoved in the battery.

Factor B: A negative electrode active material capable of absorbing and releasing lithium ions at 0.4 V (V.S. Li/Li$^+$) or more has a low reduction ability, so that it has a low HF reduction rate.

Moreover, it is considered that a part of the positive electrode which is not opposed to the negative electrode (hereinafter referred to as "positive electrode unopposed part") participates in the elution of the positive electrode. The positive electrode unopposed part is free from the release and absorption of lithium ions. Therefore the positive electrode unopposed part is put into an uncharged state and comprises a large amount of Li. Specifically, the valence number of a transition metal in the positive electrode unopposed part is low. In spite of this, the positive electrode unopposed part is electrically connected in parallel with the positive electrode opposed part which is in a charged state. Therefore, the positive electrode unopposed part is exposed to a high potential (so-called charge potential). It is therefore considered that the positive electrode unopposed part is in such an unbalanced state that it is in a fully charged state potentially but is uncharged in respect of its crystal structure. The positive electrode put into such an unbalanced state tends to be eluted by the electrolyte. Specifically, as examples of the factor of the elution of the positive electrode, the following factor is given.

Factor C: the positive electrode unopposed part is eluted by the electrolyte.

It has been clarified that in a battery using a negative electrode having a relatively high potential (for example, 0.4 V (V.S. Li/Li$^+$) or more) at which lithium ions can be inserted and released, the above factors A, B and C are overlapped, with the result that the positive electrode is eluted when the area of the negative electrode is smaller than the area of the positive electrode. Moreover, even in the case where the area of the positive electrode is equal to that of the negative electrode, micro-uncharged regions can exist because there is a variation in resistance at the edge of the electrode in the battery. Therefore, even in the case where the areas of both electrodes are equal to each other, the positive electrode can be eluted. When the positive electrode is eluted, the transition metal atom of the eluted positive electrode is precipitated on the negative electrode, causing internal short circuits in the battery. As a result, the life of the battery is shortened.

It has been confirmed that the positive electrode comprising a transition metal such as Fe, Ni, Co and Mn is eluted in the presence of HF. Therefore, such a phenomenon is significant when, particularly, $LiMn_{2-x}M_xO_4$, $LiCo_{1-y}M_yO_2$, $LiNi_{1-y}M_yO_2$, $LiNi_{0.5-z}Mn_{1.5-a}M_{z+a}O_4$, $LiMPO_4$ or $LiFe_{1-y}M_yPO_4$ is used as the positive electrode active material. In the above formula, $0 \leq x < 2$, $0 \leq y < 1$, $0 \leq z < 0.5$, $0 \leq a < 1.5$, and M is a typical metal or a transition metal.

In the Example 2 described in JP-A 10-69922 (KOKAI), "lithium-containing manganese dioxide $Li_xMnO_y$ obtained by blending 0.3 mol of lithium hydroxide is mixed in 1 mol of manganese dioxide and by heat-treating the mixture at 400° C." is used as the positive electrode active material. Because the positive electrode active material chemically synthesized in this manner is put into a charged state in advance, the positive electrode is in a uniformly charged state to some extent. When the positive electrode is put into a uniformly charged state in advance when manufacturing the battery, the above factor B is resolved and it is therefore considered that the above phenomenon did not occur in the Example 2 described in JP-A 10-69922 (KOKAI). Further, the reasons based on the HF resistance of the positive electrode, piercing strength of the separator and short test period are considered. In other words, it is necessary to put the positive electrode into a charged state in advance in the case of the battery having a structure of the Example 2 described in JP-A 10-69922 (KOKAI). Also, it may be said that it is necessary to consider the HF resistance of the positive electrode and the piercing strength of the separator.

It has been found from the above reasons (1) and (2) that even if the capacity of the negative electrode is simply made to be larger than the capacity of the positive electrode, the positive electrode can be insufficiently protected. Also, It has been found that if the area of the negative electrode is too large or too small compared to the area of the positive electrode, this is undesirable.

However, even if the capacity of the positive electrode part opposed to the negative electrode is made to be, for example, larger than the negative electrode part opposed to the positive electrode, the influence of the negative electrode part which is not opposed to the positive electrode is exerted in the end period of charge/discharge step and it is therefore difficult to protect the positive electrode without fail.

In this embodiment, focusing on potential change according to capacity change in the end period of charge/discharge step, the ratio of the capacity change in the positive electrode opposed part to the capacity change in the negative electrode opposed part is limited, to thereby restrain an excess rise (or drop) in the potential of the positive electrode. Moreover, the ratio of the area comprising the unopposed part is limited in a predetermined range to thereby limit the influence on potential change in the end period of charge/discharge step and also to limit the elution of the positive electrode.

Embodiments will be explained in detail with reference to the drawings. In this case, duplicated explanations are omitted. Each drawing is a typical view for explaining an embodiment and for promoting the understanding of the embodiments. Though there are parts different from an actual battery in shape, dimension and ratio, these structural designs may be properly changed taking the following explanations and known technologies into consideration.

(First Embodiment)

Figure 2:
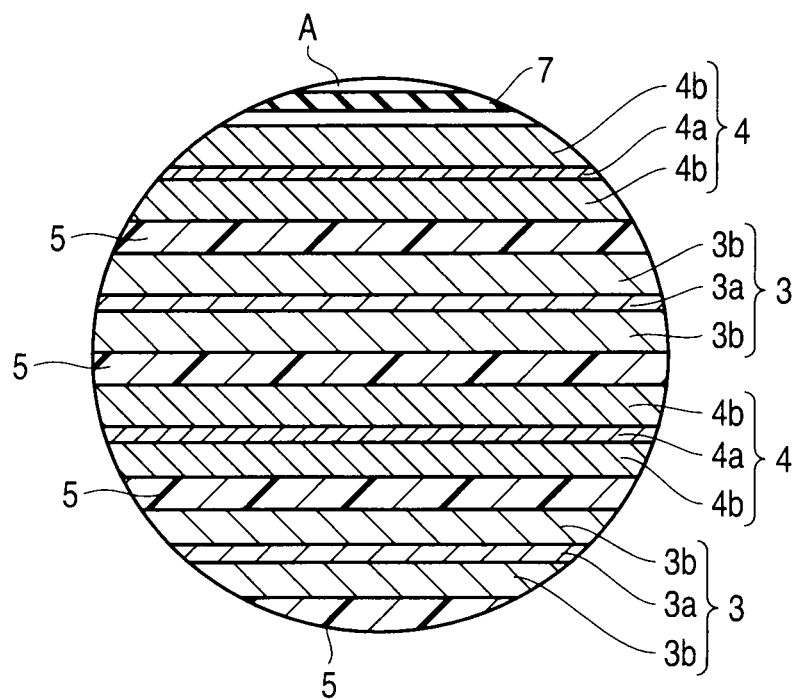
FIG. 2 is a magnified cross section of the A-part of FIG. 1.

FIG. 1 shows a schematic cross section of a flat type nonaqueous electrolyte secondary battery as an example of a nonaqueous electrolyte battery. FIG. 2 is an magnified cross section of the part A of FIG. 1. A wound electrode group 6 is constituted of a positive electrode 3, a negative electrode 4 and a separator 5 interposed between these electrodes. The negative electrode 4 is spaced apart from the positive electrode 3 by interposing the separator 5 between the positive electrode 3 and the negative electrode 4.

As shown in FIG. 1, the wound electrode group 6 is taken in a container 7 filled with the nonaqueous electrolyte. A negative electrode terminal 2 is electrically connected with the negative electrode 4 and a positive electrode terminal 1 is electrically connected with the positive electrode 3 in the vicinity of the outer peripheral end of the wound electrode group 6.

The structure of the wound electrode group 6 will be explained in more detail. As shown in FIG. 2, the positive electrode 3 and the negative electrode 4 are constituted layer-like through the separator 5. The negative electrode 4 is formed layer-like by laminating a negative electrode layer 4b, a negative electrode current collector 4a and a negative electrode layer 4b in this order. The positive electrode 3 is formed layer-like by laminating a positive electrode layer 3b, a positive electrode current collector 3a and a positive electrode layer 3b.

Here, the layers which are in contact with the separator 5 are the positive electrode layer 3b and the negative electrode layer 4b. Typical views of a structure comprising only three layers are shown in FIG. 3 and FIG. 4 for the sake of convenience. In FIG. 3 and FIG. 4, the positive electrode layer 3b and the negative electrode layer 4b are opposed to each other through the separator 5. FIG. 3 is a plan view as viewed from the positive electrode layer 3b side and a view obtained when FIG. 4 is viewed from above. FIG. 4 is a perspective view of a part excerpted from the electrode. In FIG. 4, the positive electrode layer 3b and separator 5 are cut-out partially.

As shown in the drawings, the whole region of the positive electrode layer 3b is opposed to the negative electrode layer 4b through the separator 5. On the other hand, the negative electrode layer 4b has a part opposed to the positive electrode layer 3b through the separator 5 and a part which is not opposed to the positive electrode layer 3b.

In this embodiment, the part opposed to the counter electrode through the separator is called an opposed part and the part which is not opposed to the counter electrode is called an unopposed part. Specifically, the positive electrode layer part which is opposed to the negative electrode layer 4b through a separator is a positive electrode opposed part 8. In other words, the positive electrode opposed part 8 is the part where the orthogonal projection of the positive electrode layer is overlapped with the negative electrode layer. The negative electrode layer part which is opposed to the positive electrode layer 3b through a separator is a negative electrode opposed part 9. In other words, the negative electrode opposed part 9 is the part where the orthogonal projection of the negative electrode layer is overlapped with the positive electrode layer. The negative electrode layer part which is not opposed to the positive electrode layer 3b is an negative electrode unopposed part 11. In other words, the negative electrode unopposed part 11 is the part where the orthogonal projection of the negative electrode layer is not overlapped with the positive electrode layer. In the example of FIG. 3, the whole region of the positive electrode layer 3b is opposed to the negative electrode layer 4b through the separator and therefore, the positive electrode unopposed part does not exist.

In a first embodiment, a nonaqueous electrolyte battery 20 comprises a positive electrode 3, a negative electrode 4, a separator 5, and a nonaqueous electrolyte. The positive electrode 3 comprises a positive electrode layer 3b formed on at least one surface of a positive electrode current collector 3a. The negative electrode 4 comprises a negative electrode layer 4b formed on at least one surface of a negative electrode current collector 4a. The separator 5 is interposed between the positive electrode 3 and the negative electrode 4. The negative electrode layer 4 comprises a negative electrode active material which can absorb and release lithium ions at a negative electrode potential of 0.4 V (V.S. Li/Li$^+$) or more.

The nonaqueous electrolyte battery is satisfied the following equations (I) and (II):

$$1 \leq Q2/Q1 \quad \text{(I)}$$

$$0.5 \leq C/A \leq 0.999 \quad \text{(II)}$$

In this embodiment, a negative electrode active material usable in a wide potential range is used, and the charging is controlled by the potential change of the negative electrode at the upper limit voltage of the battery (fully charged state), to protect the positive electrode from being over-charged. When the potential of the negative electrode becomes 0 V, a lithium metal is precipitated and there is therefore a fear that the cycle characteristics are deteriorated by the formation of dendrite. On the other hand, the potential change of the negative electrode is preferably larger. Accordingly, the potential at which the negative electrode can absorb and release lithium ions is desirably at least 0.4 V (V.S. Li/Li$^+$) or more. When this potential is less than 0.4 V (V.S. Li/Li$^+$), a potential difference between the upper and lower limits of the potential at which the negative electrode can absorb and release lithium ions and the precipitation potential of a lithium metal is too small. Therefore, there is the case where the over-charge protection of the positive electrode which can be achieved by the potential change of the negative electrode cannot be attained by the influences of changes in impedance and circuit voltage due to a change in temperature and change in overvoltage due to a change in current value. Further, it is preferable that the potential at which the negative electrode can absorb and release lithium ions be 2.5 V (V.S. Li/Li$^+$) or less from the viewpoint of securing energy density.

Next, the above equation (I) will be explained with reference to FIG. 5. FIG. 5 is a schematic view typically showing a positive/negative electrode potential curve in the end period of charging step.

In the formula (I), Q1 is an increment of capacity at the negative electrode opposed part 9 when the negative electrode opposed part 9 which is fully charged is applied a potential shifted to the reducing side by 0.05 V from an open circuit voltage OCV1 between the negative electrode opposed part 9 and metal lithium. The current when a potential is applied to the negative electrode is designed to be the same value as the current per unit area which is obtained by dividing one-hour rate current value (1C) to the capacity of the battery by the area of the opposed electrode part. The current is controlled by cutting voltage. Further, Q2 is an increment of capacity at the positive electrode opposed part 8 when the positive electrode opposed part 8 which is fully charged is applied a potential shifted to the oxidizing side by 0.05 V from the open circuit voltage OCV2 between the positive electrode opposed part 8 and metal lithium.

The current when a potential is applied to the positive electrode is designed to be the same value as the current per unit area which is obtained by dividing one-hour rate current value (1C) to the capacity of the battery by the area of the opposed electrode part. The current is controlled by cutting voltage.

When Q2/Q1 is 1 or more, the potential change of the positive electrode is smaller than that of the negative electrode when the capacity is increased by a certain extent. Therefore, as shown in FIG. 5, the potential of the positive electrode is not increased to an excessively high level because the potential of the positive electrode gradually rises. It is therefore possible to protect the positive electrode from over-charge without fail. Q2/Q1 is preferably 2 or more, more preferably 5 or more and even more preferably 10 or more. When Q1 is limitlessly small, Q2/Q1 is infinite and therefore, the upper limit of Q2/Q1 is not particularly limited.

The battery which is fully charged in this embodiment is the battery during one day after charging under constant current. Wherein, the battery is charged under a one-hour rate constant current to the rated capacity at the upper limit working voltage. The rated capacity is specified by a manufacturing company and a distributor of the battery. The upper limit working voltage is specified by the manufacturing company and distributor of the battery.

Further, the reason why the potential applied when Q1 and Q2 are measured is a potential shifted by 0.05 V from the open circuit voltage is that the influence of a side reaction is reduced, so that the values of Q1 and Q2 are easily detected.

The values of Q2/Q1 may be adjusted when the positive electrode and the negative electrode are manufactured. The positive electrode and negative electrode are manufactured by applying slurry comprising an active material to the current collector and drying the slurry, followed by pressing. An electrode having a desired Q2/Q1 ratio can be manufactured by controlling the blending ratio of the active material when the slurry is prepared, the amount of the slurry to be applied and the coating area and pressing pressure.

Next, the above equation (II) will be explained.

In the equation (II), A is an area of a region comprising the negative electrode opposed part 9 of the negative electrode layer 4b. In the example of FIG. 4, A is an area of the opposed part 9 and unopposed part 11 put together. On the other hand, in the equation (II), C is an area of a region comprising the positive electrode opposed part 8 of the positive electrode layer 3b. In the example of FIG. 3, C is an area of the opposed part 8. Specifically, the region comprising the opposed part in this embodiment means a region consisting of the opposed part or a region consisting of the opposed part and unopposed part. In the case of a wound electrode group, the area of the region comprising the opposed part does not include the areas of layers positioned on the outermost layer and innermost layer among the negative electrode layer and positive electrode layer.

As an example, the case where the outermost layer is the negative electrode layer 4b will be explained. As illustrated in FIG. 6, the outermost layer is a place between the position of the negative electrode layer 4b corresponding to the wound ending part of the positive electrode layer 3b and the wound ending part of the negative electrode layer 4b. In FIG. 6, the outermost layer refers to the range of the outermost side of the negative electrode layer 4b shown by the arrow. This part excludes the negative electrode opposed part.

As mentioned above, a layer among layers existing on the outermost side does not include the opposed part of one type of electrode since it is not opposed to other type of electrode through the separator. The layer is referred to as "outermost layer". This outermost layer may also be referred to as "unopposed region". When the separator 5 exists on the outermost side, an electrode layer in contact with the separator 5 is the outermost layer so-called here.

Figure 7:
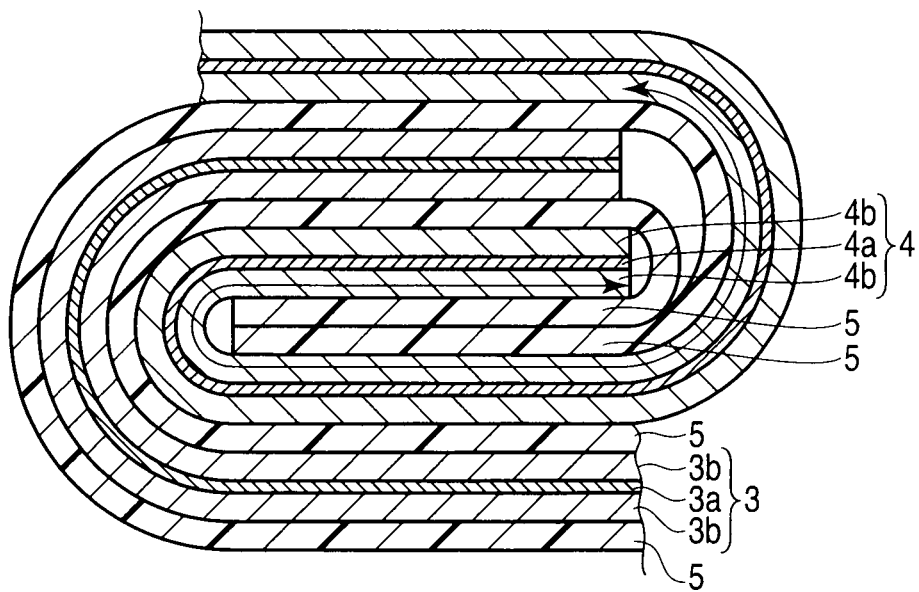
FIG. 7 is a magnified schematic view of a wound beginning part of a wound electrode group.

As an example, the case where the innermost layer is the negative electrode layer 4b will be explained. As illustrated in FIG. 7, the innermost layer is a place between the wound beginning part of the negative electrode layer 4b and the position of the negative electrode layer 4b corresponding to the wound beginning part of the positive electrode. In FIG. 7, the innermost layer refers to the range of the innermost side of the negative electrode layer 4b shown by the arrow. The part opposed to the positive electrode, that is, the negative electrode opposed part is not included in this part.

In the inner layer, the part excluding an opposed part of one type of electrode is referred to as "innermost layer" because it is not opposed to other electrode layer through the separator in the inner layer. This innermost layer may also be referred to as "unopposed region".

The outermost layer and innermost layer are not limited to the above examples but may be any of the positive electrode layer 3b and negative electrode layer 4b. Preferably, the outermost layer and innermost layer are the negative electrode layers. This implies that the positive electrode layer has no unopposed region. That is to say the positive electrode layer has no region where the positive electrode opposed part is not comprised. Preferably, the positive electrode consists substantially of the positive electrode opposed part. It is considered that similarly to the aforementioned unopposed positive electrode layer, the positive electrode put into such an unbalanced state that it is in a fully charged state potentially but is uncharged in respect of its crystal structure tends to be eluted by the electrolyte. This is because, the unopposed region is different from the unopposed part, there is no elution of the positive electrode due to the positional relation with the negative electrode or no occurrence short circuits caused by precipitation on the negative electrode. But, in the unopposed region, an increase in resistance and deterioration in capacity due to the contamination in the electrolyte solution caused by the elution of the positive electrode are eventually observed.

When C/A is less than 0.5, the positive electrode is put into an over-charged state by the influence of the unopposed part in charge-discharge cycles, leading to a significant reduction in cycle life. On the other hand, when C/A exceeds 0.99, the positive electrode is eluted in charge-discharge cycles and therefore short circuits are occurred, resulting in a significantly short battery life. C/A is preferably 0.85 to 0.99 and more preferably 0.95 to 0.988.

The opposed part, the unopposed part, the outermost layer and the innermost layer will be explained in detail, taking electrode groups having various shapes as examples.

Figure 8A:
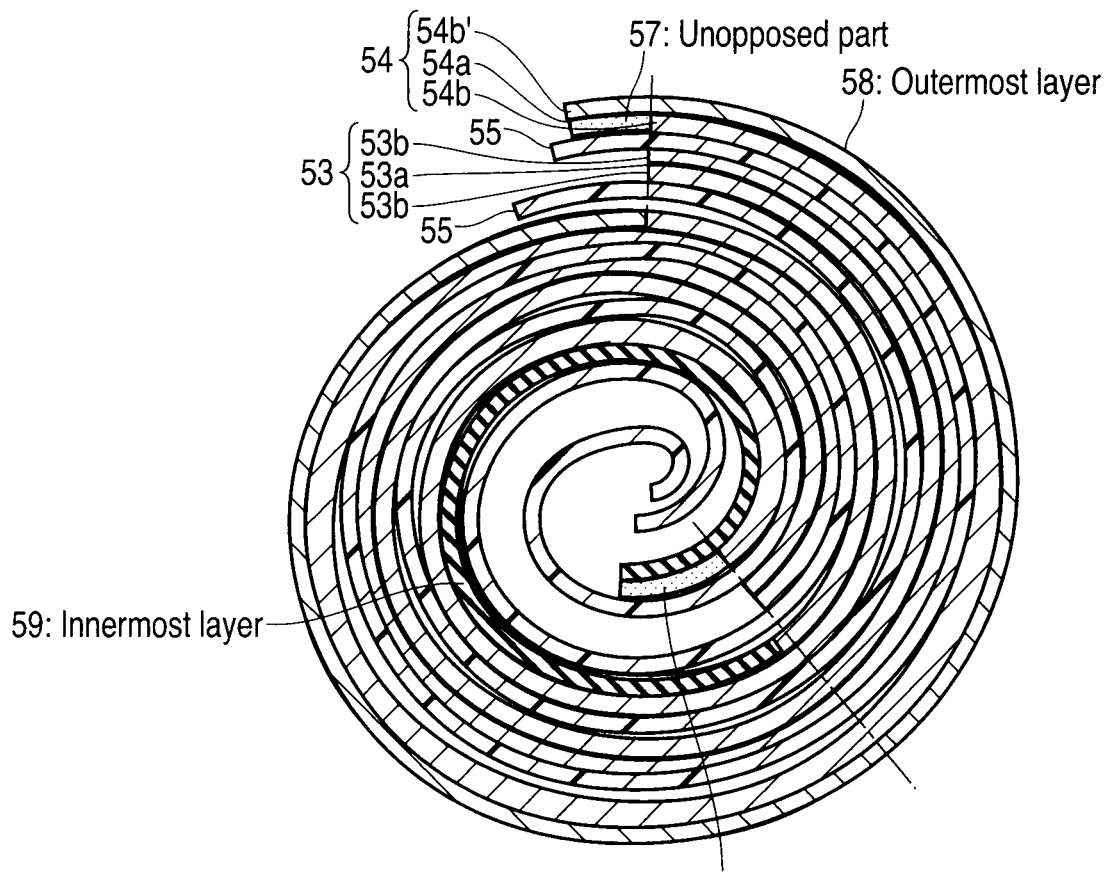
FIG. 8A is a schematic cross section of a wound electrode group having a cylinder form.
Figures 8B, 8C:
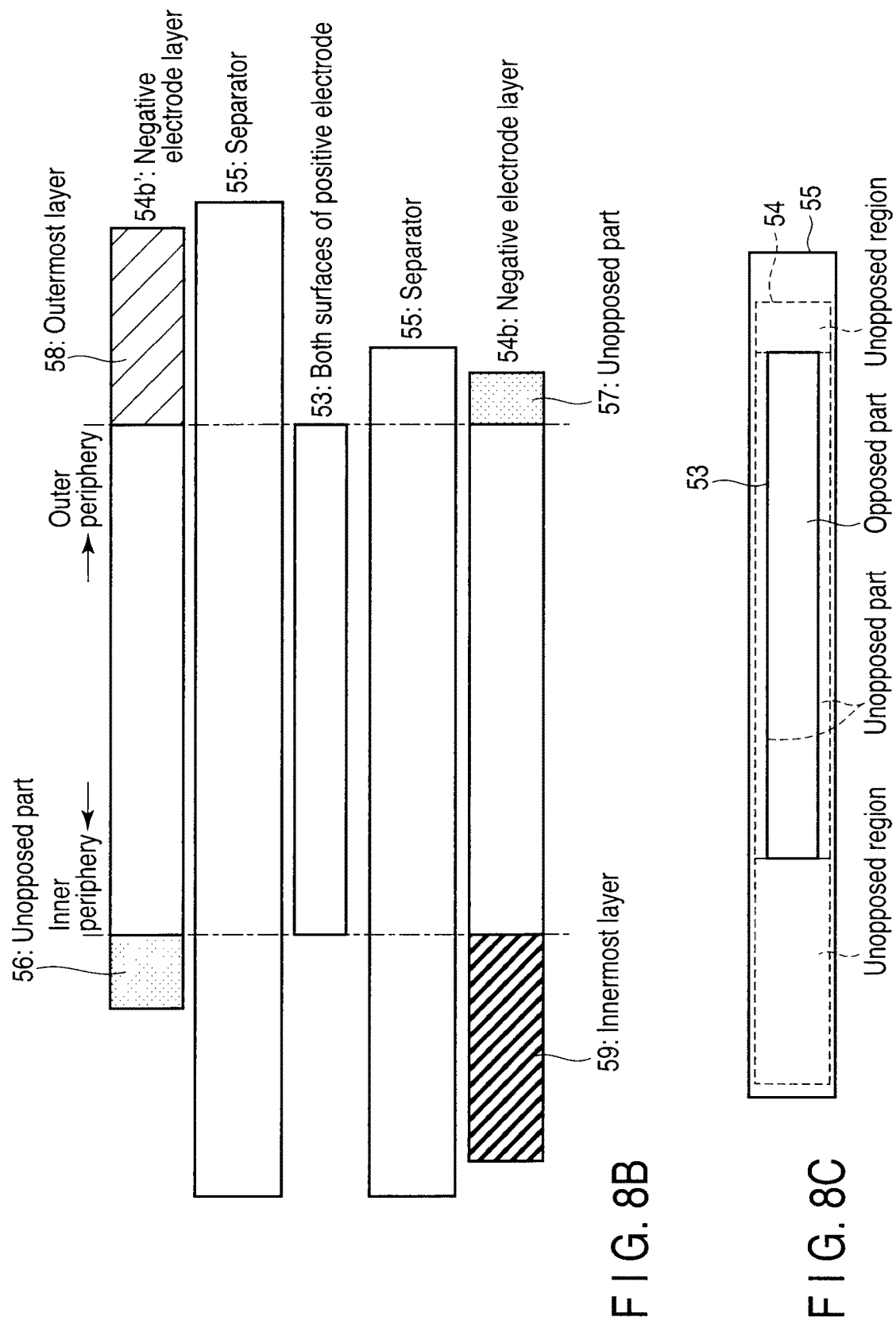
FIG. 8B is a developed view of a wound electrode group having a cylinder form.
FIG. 8C is a plan view of a wound electrode group having a cylinder form.

FIG. 8A and FIG. 8B are a schematic cross section and a developed view of a wound electrode group having a cylinder shape, respectively, and FIG. 8C is a plan view when the wound electrode group is unwounded and viewed from the positive electrode side. The electrode group shown in FIG. 8A has a structure in which a positive electrode 53, a negative electrode 54 and a separator 55 interposed between these electrodes have a layer structure and are wounded into a cylinder form. The positive electrode 53 is spaced apart from the negative electrode 54 by interposing the separator 55 between the positive electrode 53 and the negative electrode 54.

The negative electrode 54 has a layer-like structure in which a negative electrode layer 54b', a negative electrode current collector 54a, and a negative electrode layer 54b are laminated in this order from the outside layer. The positive electrode 53 has a layer-like structure in which a positive electrode layer 53b, a positive electrode current collector 53a, and a positive electrode layer 53b are laminated in this order from the outside layer.

As shown in FIG. 8A and FIG. 8B, the outside negative electrode layer 54b' is provided with an unopposed part 56 at the wound beginning part and then, a region where an opposed part disposed opposite to the positive electrode through the separator and an unopposed part coexist, and the outermost layer 58 at the wound ending part. On the other hand, the inner side negative electrode layer 54b is provided with an innermost layer 59 at the wound beginning part, then, a region where an opposed part disposed opposite to the positive electrode through the separator and an unopposed part coexist, and an unopposed part 57 at the wound ending part.

More specifically, as shown in FIG. 8C, in a part where the negative electrode 54/separator 55/positive electrode 53 are overlapped from the bottom, the parts where the negative electrode layer 54b and the positive electrode layer 53b are orthogonal projections are an opposed part because these parts are disposed opposite to each other through the separator. On the other hand, the parts where the negative electrode layer 54b and the positive electrode layer 53b are not orthogonal projections are an unopposed part. The unopposed part is a part which is not disposed opposite to another electrode through a separator, though it is disposed on the same region as the opposed part.

Such a wound electrode group is, as shown in the plan view of FIG. 8C, provided with an unopposed region on both of the left and right ends thereof (i.e. outermost layer and innermost layer) and an opposed part and an unopposed part between these ends. The outermost layer, as shown in FIG. 8A, is a part which is not disposed opposite to the positive electrode through the separator 55 in the outermost peripheral negative electrode layer 54b'. The innermost layer, as shown in FIG. 8A, is a part which is not disposed opposite to the positive electrode through the separator 55 in the innermost peripheral negative electrode layer 54b.

Figure 9:
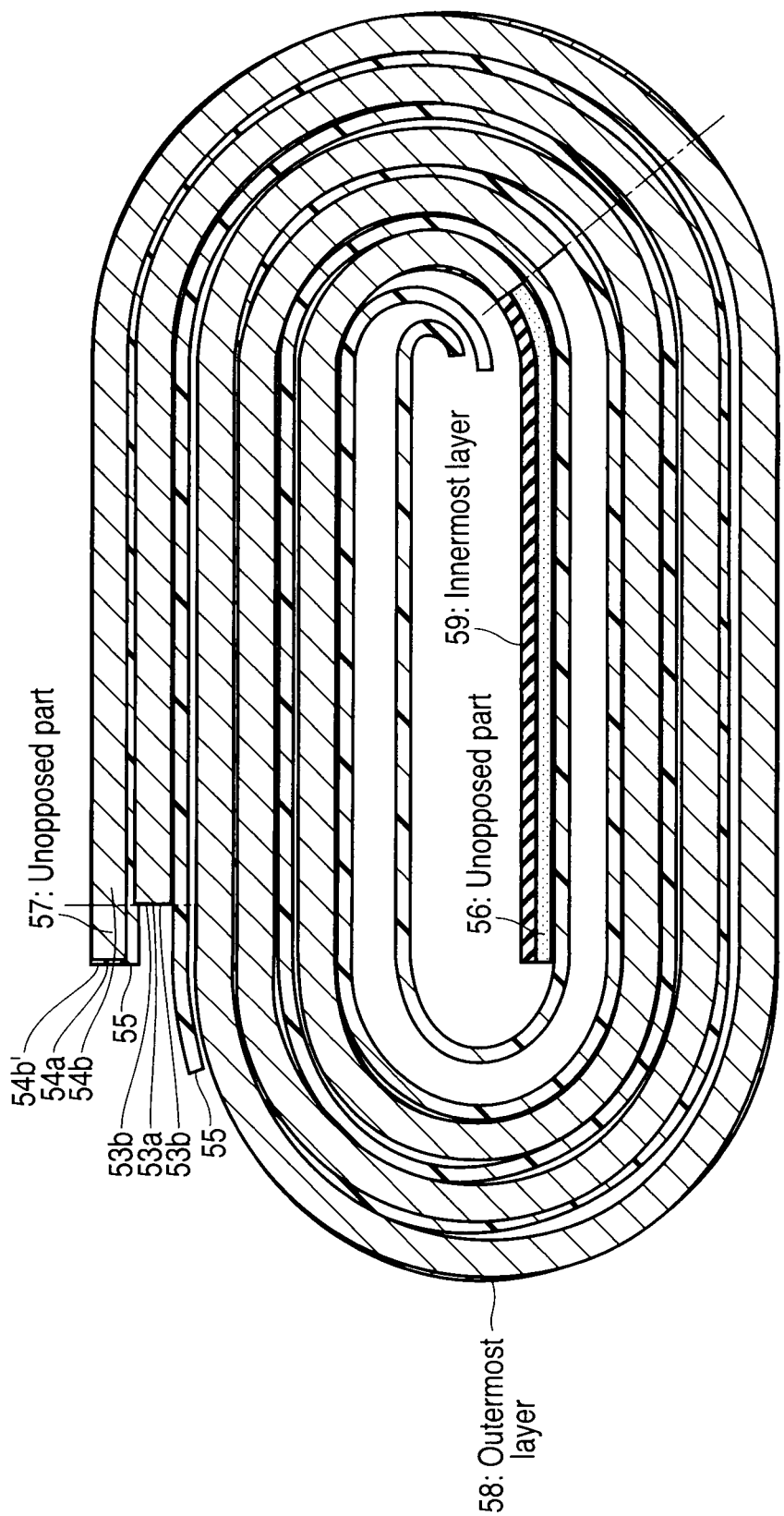
FIG. 9 is a schematic cross section of a wound electrode group having a flat form.

FIG. 9 is a schematic cross section of a wound electrode group having a flat form. Similarly to the wound electrode group having a cylinder form as shown in FIG. 8, the wound electrode group having a flat form as shown in FIG. 9 has a structure in which a positive electrode 53, a negative electrode 54 and a separator 55 interposed between these electrodes have a layer structure and are wounded into a flat form. The positive electrode 53 is spaced apart from the negative electrode 54 by interposing the separator 55 between the positive electrode 53 and the negative electrode 54.

The negative electrode 54 has a layer-like structure in which a negative electrode layer 54b', a negative electrode current collector 54a, and a negative electrode layer 54b are laminated in this order from the outside layer. The positive electrode 53 has a layer-like structure in which a positive electrode layer 53b, a positive electrode current collector 53a, and a positive electrode layer 53b are laminated in this order.

As shown in FIG. 9, the outside negative electrode layer 54b' is provided with an unopposed part 56 at the wound beginning part and then, a region where an opposed part disposed opposite to the positive electrode through the separator and an unopposed part coexist, and the outermost layer 58 at the wound ending part. On the other hand, the inner side negative electrode layer 54b is provided with an innermost layer 59 at the wound beginning part, then, a region where an opposed part disposed opposite to the positive electrode through the separator and an unopposed part coexist, and an unopposed part 57 at the wound ending part. As mentioned above, similarly to the wound electrode group having a cylinder form, the wound electrode group having a flat form is provided with the opposed part, unopposed part, innermost layer and outermost layer.

FIG. 10A is a developed view of a coin type electrode group, FIG. 10B is an exploded sectional view showing the structural elements of a coin type electrode group and FIG. 10C is a plan view of a coin type electrode group as viewed from the negative electrode side.

An electrode group shown in FIG. 10A has a structure in which a negative electrode 74, a separator 75 and a positive electrode 73 are laminated. With the structure in which the separator 75 is interposed between the negative electrode 74 and the positive electrode 73, the negative electrode 74 is spaced apart from the positive electrode 73. In the negative electrode 74, a negative electrode layer 74b is formed layer-like on a metal substrate 74a and the negative electrode layer 74b is in contact with the separator 75. In the positive electrode 73, a positive electrode layer 73b is formed layer-like on a metal substrate 73a and the positive electrode layer 73b is in contact with the separator 75.

As shown in FIG. 10B and FIG. 10C, the part where the positive electrode layer 73b and the negative electrode layer 74b are overlapped on each other through the separator 75 is an opposed part 76. The outer regions of the negative electrode layer 74b where the positive electrode layer 73b and the negative electrode layer 74b are not overlapped is an unopposed part 77. Any unopposed region does not exist in a coin type electrode group like this.

Figure 11A:
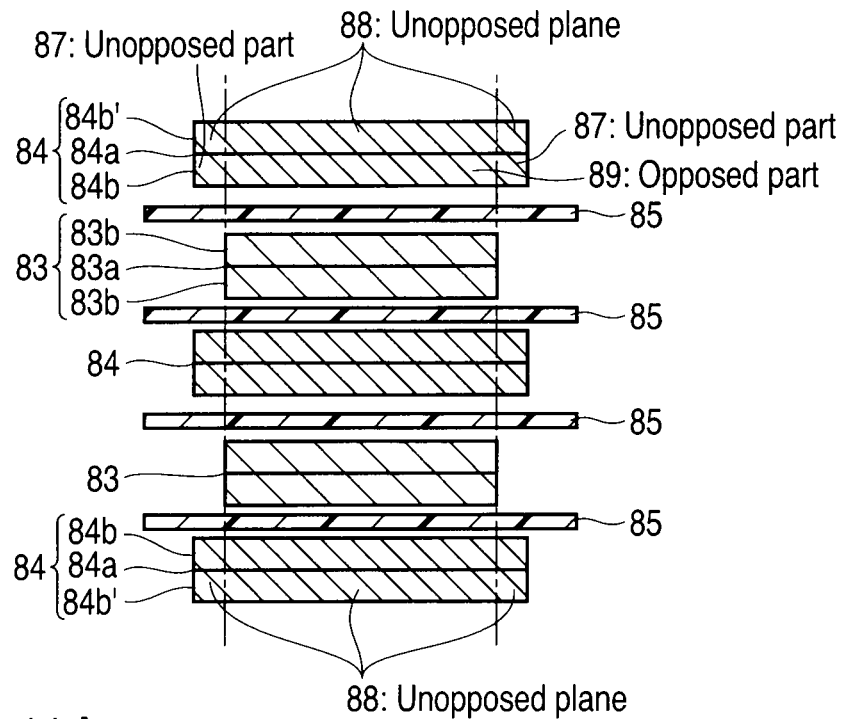
FIG. 11A is an exploded schematic cross section of a laminate type electrode group.
Figure 11B:
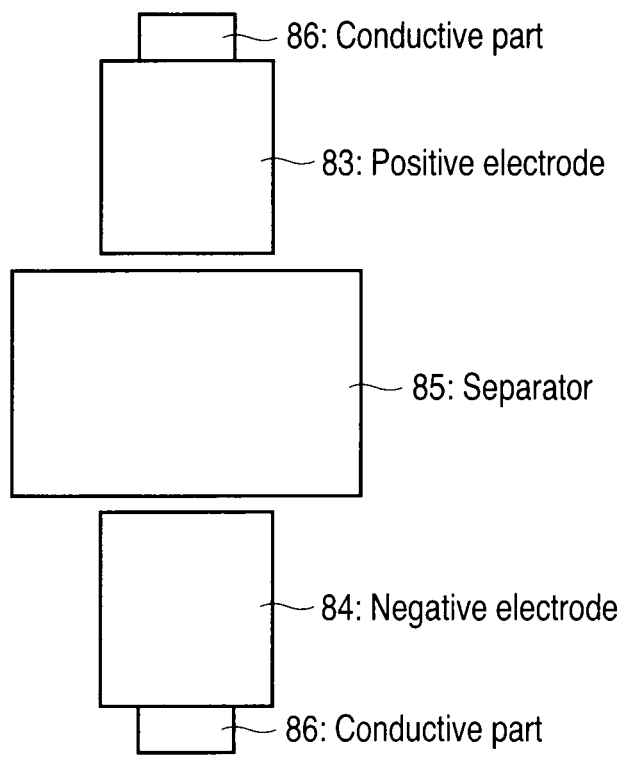
FIG. 11B is a developed view of a laminate type electrode group.
Figure 11C:
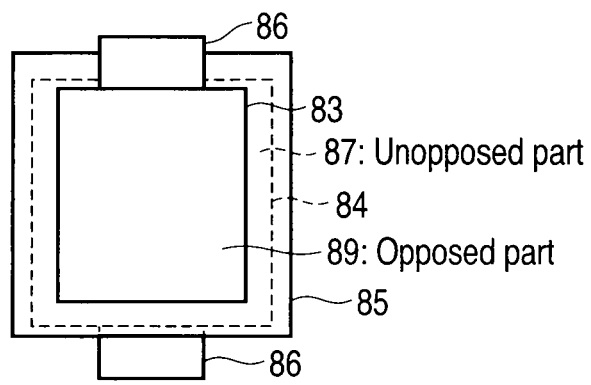
FIG. 11C is a plan view of a laminate type electrode group.

FIG. 11A is an exploded schematic cross section of the structural elements of a laminate type electrode group and FIG. 11B is a developed view of a part of a laminate type electrode group. FIG. 11C is a plan view of a laminate type electrode group in which a negative electrode 84, a separator 85 and a positive electrode 83 are laminated in this order from the bottom as viewed from the positive electrode side.

As shown in FIG. 11A, the electrode group has a structure in which the positive electrode 83 and the negative electrode 84 are alternately laminated through the separator 85. The positive electrode 83 is provided with a conductive part 86 projected from one side thereof. The negative electrode 84 is provided with a conductive part 86 projected from one side thereof. The positive electrode 83 and the negative electrode 84 are laminated such that the conductive parts 86 projected from the positive electrode 83 and negative electrode 84 are placed on the opposite side.

The structure in which the separator 85 is interposed between the positive electrode 83 and the negative electrode 84 allows the positive electrode 83 to be spaced apart from the negative electrode 84. The positive electrode 83 has a structure in which a positive electrode 83b, a positive electrode current collector 83a and a positive electrode layer 83b are laminated in this order. The negative electrode 84 has a structure in which a negative electrode 84b, a negative electrode current collector 84a and a negative electrode layer 84b are laminated in this order. In this case, a negative electrode layer positioned at the outermost side of the electrode group is designated as 84b'.

As is understood from FIG. 11A and FIG. 11C, the part where the positive electrode 83 and the negative electrode 84 are overlapped on each other through the separator 85 is an opposed part 89. The outer regions of the negative electrode layer 84b where the positive electrode layer 83b and the negative electrode layer 84b are not overlapped is an unopposed part 87. In the electrode group in FIG. 11, the uppermost negative electrode layer 84b' and the lowermost negative electrode layer 84b' are unopposed regions 88. In the electrode group shown in FIG. 11, neither an unopposed part nor an unopposed region exists in the positive electrode.

According to each embodiment explained above, the positive electrode can be protected from over-charge and also deterioration in capacity in a positive electrode cycle is suppressed, making it possible to provide a nonaqueous electrolyte battery improved in cycle life.

Next, the positive electrode 3, negative electrode 4, nonaqueous electrolyte, separator 5 and container 7 will be explained in detail.

<Positive Electrode>

The positive electrode 3 comprises a positive electrode active material, a conductive material and a binder. For example, a positive electrode is manufactured by applying a slurry comprising these materials to at least one surface of a current collector and by drying, followed by pressing. As the current collector, a metal substrate may be used.

Any material may be used as the positive electrode active material insofar as it can absorb and release lithium or other alkali metals to thereby charge/discharge. It is preferable to use at least one composite oxide selected from the group consisting of, $LiMn_{2-x}M_xO_4$, $LiCo_{1-y}M_yO_2$, $LiNi_{1-y}M_yO_2$, $LiNi_{0.5-z}Mn_{1.5-a}M_{z+a}O_4$, $LiMPO_4$ and $LiFe_{1-y}M_yPO_4$. In the above formula, $0 \leq x < 2$, $0 \leq y < 1$, $0 \leq z < 0.5$, $0 \leq a < 1.5$, and M is a typical metal or a transition metal. These active materials are superior in cycle characteristics and capacity characteristics, while the deterioration of them are easily promoted by over-charge and over-discharge and they are also easily eluted. Accordingly, when these active materials are used, the effect of this embodiment is produced more significantly.

Any conductive material may be used as long as it has an adequate conductivity. It is preferable to use carbon or a combination of it. Examples of the carbon include carbon black such as acetylene black and carbon materials such as graphite.

Any binder material may be used as long as it is generally used in nonaqueous electrolyte batteries. It is preferable to use electrochemically stable materials such as a polyvinylidene fluoride and polytetrafluoroethylene.

<Negative Electrode>

The negative electrode 4 comprises a negative electrode active material, a conductive material and a binder. For example, a negative electrode is manufactured by applying a slurry comprising these materials to at least one surface of a current collector and by drying, followed by pressing. As the current collector, a metal substrate may be used. As the current collector, it is preferable to use aluminum from the viewpoint of cost and weight when a high-potential negative electrode having a lithium ion-insertion/release potential of 0.4 V (V.S. Li/Li$^+$) or more is used.

As the negative electrode active material, materials are used which have the characteristics that the potential at which lithium ions can be inserted and released is 0.4 V (V.S. Li/Li+) or more based on the redox potential of Li or more. Further, it is necessary that the negative electrode be more resistant to over-charge than the positive electrode. Therefore, it is preferable to use material which exhibits little change in lattice volume in a wide potential range. As the negative electrode active material, for example, lithium titanate having the spinel structure, other lithium titanate, titanium oxide or iron sulfide is preferable from the viewpoint of potential resistance, cycle resistance and a difference from lithium dendrite production potential. Particularly, lithium titanate having the spinel structure has a high charge-discharge efficiency and is also reduced in structural change in charge-discharge cycles and therefore has a long life. Therefore, the effect of this embodiment is produced more efficiently by using lithium titanate having the spinel structure.

Any conductive material may be used as long as it has an adequate conductivity. It is preferable to use carbon or a combination of it. Examples of the carbon include carbon black such as acetylene black and carbon materials such as graphite.

Any binder material may be used as long as it is generally used in nonaqueous electrolyte batteries. It is preferable to use an electrochemically stable material such as a polyvinylidene fluoride, polytetrafluoroethylene, carboxymethyl cellulose, styrene-butadiene rubber and mixtures of these compounds.

<Separator>

The separator 5 is used to avoid the electrical contact between the positive electrode 3 and the negative electrode 4. The separator 5 is also used to avoid an increase in resistance and volume due to the distance between these electrodes. When the distance between the electrodes is sufficient and the resistance during use is in an allowable range, it is unnecessary to use the separator 5.

As the separator 5, a material which has a porous structure and can transmit ions is used. A film material is preferably used. For example, a polyethylene, polypropylene or cellulose is preferable. A polyolefin separator manufactured by a dry method and a separator manufactured using nonwoven fabric is preferably used. The dry method is reduced in cost. The film manufactured by the dry method is superior in the penetration of the electrolyte solution and in the passing of ions. While a porous structure may be formed in such a film. The porous structure in the film may be formed mainly by tension after the film is formed. Then the film manufactured by the dry method may have holes close to through-holes and there is the case where short circuits are easily occurred. Therefore, the effects of this embodiment are produced more advantageously when using the separator manufactured by the dry method. This is the same for the case of a nonwoven fabric.

<Electrolyte>

As the electrolyte, a support salt which conducts ions and solvent or molten salt may be used. As the support salt, $LiPF_6$, $LiBF_4$ and imide-based support salts may be used. The use of $LiPF_6$ enables the production of a battery which has a high ion-transfer speed and high input/output. Further, in the case of using a combination of $LiPF_6$ and $LiBF_4$, a battery having a very high output and long life can be manufactured. However, these batteries have a high rate of HF production particularly at high temperature, so that they tend to induce the elution of the positive electrode. Therefore, according to this embodiment, a battery which is limited to a minimum in the elution of the positive electrode and has a very high output and long life can be provided. The concentration of $LiPF_6$ in the electrolyte solution is preferably 0.5 mol/l to 2.0 mol/l and more preferably 1 mol/l to 1.7 mol/l. When a mixture of $LiPF_6$ and $LiBF_4$ is used, the molar ratio of $LiPF_6$ and $LiBF_4$ is preferably in a range from 0.25 to 4 and more preferably in a range from 0.5 to 2. When a mixed salt of $LiPF_6$ and $LiBF_4$ is used, the total concentration of $LiPF_6$ and $LiBF_4$ is preferably 0.5 mol/l to 2 mol/l and more preferably 1 mol/l to 2 mol/l.

As the solvent of the electrolyte, an organic solvent having high permittivity, such as ethylene carbonate (EC), propylene carbonate (PC) and gamma butyrolactone (γ-BL) and low-viscosity solvents such as diethyl carbonate (DEC), ethylmethyl carbonate (EMC) and dimethyl carbonate (DMC) are used. It is known that when, particularly, propylene carbonate and diethyl carbonate are used, the oxidation resistance of an electrolyte solution is high and the cycle characteristics of the positive electrode are improved. However, it is also known that in the case of this combination, the electrolyte solution is easily reduced in the case of a carbon negative electrode and the production rate of HF in the electrolyte solution is raised. Therefore, when a combination of propylene carbonate and diethyl carbonate is used, the effect of this embodiment is produced more advantageously.

<Container>

As the container 7, for example, an aluminum laminate or aluminum can or iron can may be used.

According to the first embodiment as is explained above, by using a negative electrode comprising a negative electrode active material which can absorb and release lithium ions at 0.4 V (V.S. Li/Li$^+$) or more and by using a positive electrode and a negative electrode which satisfy the above equations (I) and (II), a nonaqueous electrolyte battery can be provided in which the positive electrode is protected from over-charge and limited in the elution and which is improved in cycle life.

(Second Embodiment)

Next, a second embodiment will be explained. In the second embodiment, a nonaqueous electrolyte battery 20 comprises a positive electrode 3, a negative electrode 4, a separator 5, and a nonaqueous electrolyte. The positive electrode 3 comprises a positive electrode layer 3b formed on at least one surface of a positive electrode current collector 3a. The negative electrode 4 comprises a negative electrode layer 4b formed on at least one surface of a negative electrode current collector 4a. The separator 5 is interposed between the positive electrode 3 and the negative electrode 4.

The negative electrode layer 4 comprises a negative electrode active material which can absorb and release lithium ions at a negative electrode potential of 0.4 V (V.S. Li/Li$^+$) or more. The nonaqueous electrolyte battery satisfying the following equations (III) and (IV):

$$1 \leq Q4/Q3 \tag{III}$$

$$0.5 \leq C/A \leq 0.999 \tag{IV}$$

In this embodiment, a negative electrode active material usable in a wide potential range is used, and the discharging is controlled by the potential change of the negative electrode at the lower limit voltage (discharge state) of the battery, to protect the positive electrode from being over-discharged. When the potential of the negative electrode becomes 0 V, a lithium metal is precipitated and there is therefore a fear that the cycle characteristics are deteriorated by the formation of dendrite. On the other hand, the potential change of the negative electrode is preferably larger. Accordingly, the potential at which the negative electrode can absorb and release lithium ions is desirably 0.4 V (V.S. Li/Li$^+$) or more. When this potential is less than 0.4 V (V.S. Li/Li$^+$), a potential difference between the upper and lower limits of the potential at which the negative electrode can absorb and release lithium ions and the precipitation potential of a lithium metal is too small. Therefore, there is the case where the over-discharge protection of the positive electrode which can be achieved by the potential change of the negative electrode cannot be attained by the influences of changes in impedance and circuit voltage due to a change in temperature and change in overvoltage due to a change in current value. Further, it is preferable that the potential at which the negative electrode can absorb and release lithium ions be 2.5 V (V.S. Li/Li$^+$) or less from the viewpoint of ensuring energy density.

Figure 12:
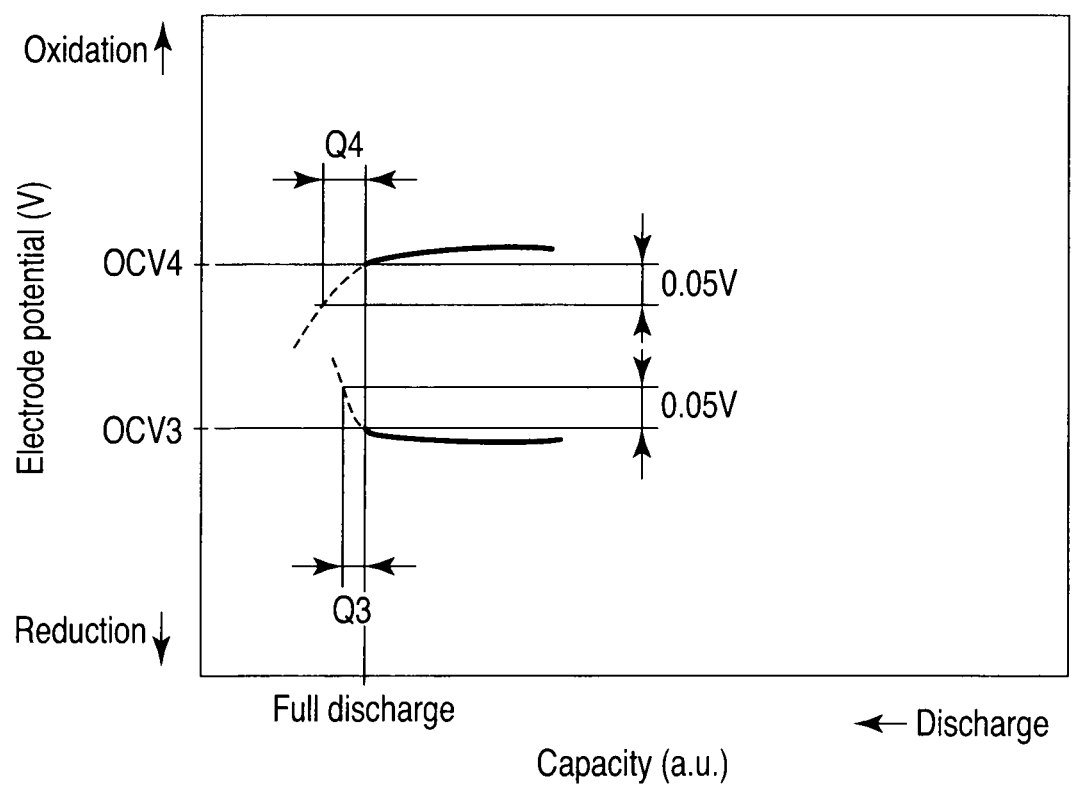
FIG. 12 is a schematic view of a potential curve of positive and negative electrodes in the end period of discharging step.

Next, the above equation (III) will be explained with reference to FIG. 12. FIG. 12 is a schematic view typically showing a positive/negative electrode potential curve in the end period of discharging step.

In the formula (III), Q3 is a decrement of capacity at the negative electrode opposed part 9 when the negative electrode opposed part 9 which is fully discharged is applied a potential shifted to the oxidizing side by 0.05 V from an open circuit voltage OCV3 between the negative electrode opposed part 9 and metal lithium. The current when a potential is applied to the negative electrode is designed to be the same value as the current per unit area which is obtained by dividing one-hour rate current value (1C) to the capacity of the battery by the area of the opposed electrode part. The current is controlled by cutting voltage. Further, Q4 is a decrement of capacity at the positive electrode opposed part 8 when the positive electrode opposed part 8 which is fully discharged is applied a potential shifted to the reducing side by 0.05 V from the open circuit voltage OCV4 between the positive electrode opposed part and metal lithium. The current when a potential is applied to the positive electrode is designed to be the same value as the current per unit area which is obtained by dividing one-hour rate current value (1C) to the capacity of the battery by the area of the opposed electrode part. The current is controlled by cutting voltage.

When Q4/Q3 is 1 or more, the potential change of the positive electrode is smaller than that of the negative electrode when the capacity is decreased by a certain extent. Therefore, as shown in FIG. 12, the potential of the positive electrode drops gradually, and therefore, the potential of the positive electrode does not become too low. This ensures that the positive electrode can be protected from over-discharge without fail. Q4/Q3 is preferably 2 or more, more preferably 5 or more and even more preferably 10 or more. When Q3 is limitlessly small, Q4/Q3 is infinite and therefore, the upper limit of Q4/Q3 is not particularly limited.

The fully discharged battery in this embodiment is the battery during one day after discharging under constant current. Wherein, the battery is discharged under a one-hour rate constant current to the rated capacity at the lower limit working voltage. The rated capacity is specified by a manufacturing company or a distributor of the battery. The lower limit working voltage is specified by the manufacturing company or distributor of the battery.

Further, the reason why the potential applied when Q3 and Q4 are measured is a potential shifted by 0.05 V from the open circuit voltage is that the influence of a side reaction is reduced, so that the values of Q3 and Q4 are easily detected.

The values of Q3/Q4 may be adjusted when the positive electrode and the negative electrode are manufactured. The electrode is manufactured by laminating the positive electrode and negative electrode with a separator being interposed therebetween. The positive electrode and negative electrode are manufactured by applying slurry comprising an active material to a current collector and drying the slurry, followed by pressing. An electrode having a desired Q4/Q3 ratio can be manufactured by controlling the blending ratio of the active material when the slurry was prepared, the amount of the slurry to be applied and the coating area and pressing pressure.

The above equation (IV) has the same meanings as given above regarding equation (II). Further, the positive electrode 3, negative electrode 4, nonaqueous electrolyte, separator 5 and container 7 are also the same as those described in the first embodiment.

According to this second embodiment as is explained above, by using a negative electrode comprising a negative electrode active material which can absorb and release lithium ions at 0.4 V (V.S. Li/Li$^+$) or more and by using a positive electrode and a negative electrode which satisfy the above equations (III) and (IV), a nonaqueous electrolyte battery can be provided in which the positive electrode is protected from over-discharge and limited in the elution and which is improved in cycle life.

The structures in the first embodiment and second embodiment may be used either independently or in combination. When the structures of the first embodiment and second embodiment are used in combination, both the over-charge and over-discharge of the positive electrode can be avoided, so that the nonaqueous electrolyte further improved in cycle life can be provided.

Moreover, in the above first embodiment and second embodiment, the first cycle charge-discharge efficiency of the positive electrode is preferably higher than that of the negative electrode. When the first cycle charge-discharge efficiency of the positive electrode is lower than that of the negative electrode, even if the first cycle charge-discharge capacity of the positive electrode is higher than that of the negative electrode, the charge-discharge capacity of the positive electrode is smaller than that of the negative electrode after the second cycle, with the result that Q4/Q3 can be 1 or less. When the capacity of the positive electrode is smaller than the capacity of the negative electrode, this means positive electrode restriction and the positive electrode is in an over-charge or over-discharge state. It is therefore preferable that the first cycle charge-discharge efficiency of the positive electrode be higher than that of the negative electrode.

In this embodiment, the first cycle charge-discharge efficiency is determined in the following manner.

An electrode to be measured, a counter electrode (Li metal) and a reference electrode (Li metal) are used to manufacture a simple cell. The electrolyte can be prepared by mixing ethylene carbonate (EC) and methylethyl carbonate (MEC) in a ratio by volume of 1:2 and adding the mixture 1 mol/l of LiPF$_6$.

In the case of the positive electrode, it is charged up to a charge potential +0.1 V than the dipping potential under a current of 1 mA/cm$^2$ at 25° C. The charge is stopped depending on the potential. Then, the battery is left for 10 minutes, and then it is discharged down to the initial dipping potential under a current of 1 mA/cm$^2$. The discharge is stopped depending on the potential. Here, the ratio of the capacity when the battery charges to the capacity when the battery discharges is referred to as "first cycle charge-discharge efficiency" in that potential range.

Next, the potential of charge potential to be cut is increased up to 4.5 V by 0.1 V. Charge/discharge in each potential step is carried using a new electrode. The maximum efficiency among the first cycle charge-discharge efficiencies calculated in this manner at each charge potential is defined as the "first cycle charge-discharge efficiency" of the positive electrode.

In the case of the negative electrode, it is charged down to a charge potential −0.1 V than the dipping potential and the same operations as above are carried out. In the negative electrode, the potential to be cut is decreased down to 0.4 V by 0.1 V, and carry out the same operations as in the case of the positive electrode.

In the above first and second embodiments, the explanations are made taking a flat type nonaqueous electrolyte battery as an example. However, the form of nonaqueous electrolyte battery is not limited to that and nonaqueous electrolyte batteries having other forms may also be used. As one embodiment, a closed type angular nonaqueous electrolyte battery will be explained. As shown in FIG. 13, an angular nonaqueous electrolyte battery 30 is provided with a package can 37, a flat type electrode group (not shown) taken in the package can 37, a lid 35 attached to an opening part of the package can 37 and positive and negative electrode terminals 31 and 32 set to the lid 35 through an insulating gaskets 34 and 33 respectively. The positive electrode terminal 31 and the negative electrode terminal 32 are electrically connected with the electrode group through a lead (not shown).

The package can 37 has an angular cylindrical form, with a bottom and is formed of a metal such as aluminum, aluminum alloys, iron and stainless steel. The electrolytic solution (not shown) is poured in the package can 1 and the flat type electrode group is impregnated with the electrolytic solution.

The lid 35 is attached to the opening part of the package can 37 by, for example, seam welding using a laser. The lid 35 is formed of a metal such as aluminum, aluminum alloys, iron or stainless. The lid 35 and the package can 31 are preferably formed of the same type of metal.

Further, the electrode group is not limited to a wound electrode group but a laminate type electrode group may also be used.

With regard to each nonaqueous electrolyte battery in the above first and second embodiments, it is recommended that the battery is used under the condition where the upper limit and lower limit of the voltage is the one in the fully charged battery and fully discharged battery used to measure the above Q1 and Q2, and Q3 and Q4, respectively.

(Third Embodiment)

In a third embodiment, a battery pack is provided. The battery pack comprises one or more of the nonaqueous electrolyte batteries according to the first and/or second embodiments. In the case of comprising a plurality of unit cells, these unit cells are arranged such that they are electrically connected in series or in parallel.

In a battery pack for vehicles, it is preferable to connect unit cells in series to obtain a high voltage.

Figure 14:
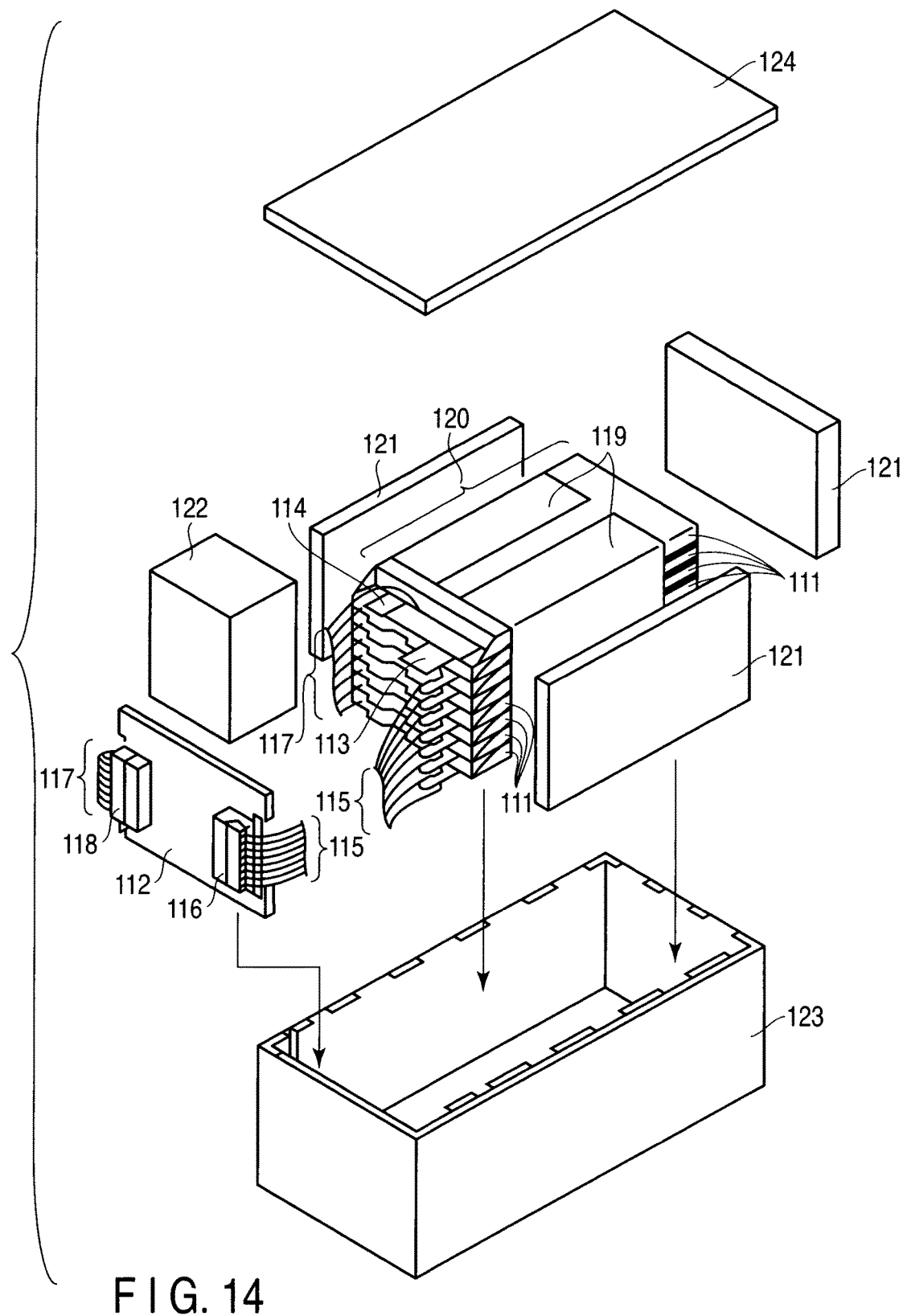
FIG. 14 is an exploded oblique view of a battery pack according to a third embodiment.

An example of the battery pack according to this embodiment will be explained with reference to FIG. 14 and FIG. 15. FIG. 14 is an exploded oblique view of the battery pack. FIG. 15 is a block diagram showing an electric circuit of the battery pack.

As shown in FIG. 14, the plural unit cells 111 (for example, eight unit cells) having a flat form are laminated in the direction of the thickness to form a battery module 120. Unit cells 111 are electrically connected. In each unit cell 111, a positive electrode terminal 113 connected with the positive electrode is drawn out of the container. In each unit cell 111, a negative electrode terminal 114 connected with the negative electrode is drawn out of the container. A printed wiring board 112 is disposed on the side surface from which the positive electrode terminal 113 and negative electrode terminal 114 are projected.

The positive electrode terminal 113 is electrically connected with a positive electrode connector 116 through a positive electrode wiring 115. The negative electrode terminal 114 is electrically connected with a negative electrode connector 118 through a negative electrode wiring 117. The positive electrode connector 116 and the negative electrode connector 118 are connected with counter connector mounted on the printed wiring boards 112, respectively.

The battery module 120 is secured by an adhesive tape 119. With regard to the battery module 120, a protective sheet 121 made of rubber or resin is disposed on each of the three sides thereof except for the side from which the positive electrode terminal 113 and negative electrode terminal 114 are projected. A protective block 122 having a block form and made of a rubber or resin is disposed between the side from which the positive electrode terminal 113 and negative electrode terminal 114 are projected and the printed wiring board 112.

This battery module 120 is taken in a case 123 together with each protective sheet 121, protective block 122 and printed wiring board 112. A lid 124 is attached to the upper surface of the case 123.

Hereinafter, each structure will be explained in detail. The printed wiring board 112 comprises, as shown in FIG. 15, a thermistor 125, a protective circuit 126 and a conducting terminal 127 that conducts electricity to external devices.

The thermistor 125 is used to detect the temperature of the unit cell 111 and the detected signals are transmitted to the protective circuit 126.

A wiring 128a and a wiring 128b between the protective circuit 126 and the conducting terminal 127 are used to conduct electricity to external devices. The protective circuit 126 can shut off a wiring 128a and a wiring 128b in a predetermined condition. The predetermined condition means, for example, the case where the temperature detected by the thermistor 125 is equal to or more than a predetermined temperature. Further, the predetermined condition means the case of detecting over-charge, over-discharge, over-current and the like of the unit cell 111. This detecting method is carried out with respect to individual unit cells 111 or the entirety of the unit cells. When individual unit cells 111 are detected, the battery voltage may be detected or the positive electrode or negative electrode potential may be detected. In the latter case, a lithium electrode to be used as a reference electrode is inserted into each unit cell 111. In the case of FIG. 15, the protective circuit 126 is provided with a battery voltage monitor circuit section. Each unit cell 111 is connected with the battery voltage monitor circuit section through a wiring 129. Such a structure enables the battery voltage of each unit cell 111 to be detected by the protective circuit 126.

In the case of this embodiment, the potential of the positive electrode or negative electrode can be well controlled by detecting battery voltage, and therefore this embodiment is particularly adaptable to the case where the protective circuit only detects battery voltage.

A thermal shrinkage tape may be used in place of the adhesive tape 119 to secure the battery module 120. In this case, a protective sheet 121 is disposed on both sides of the battery module 120 and the thermal shrinkage tube is wound around. Then, the thermal shrinkage tube is thermally shrunk to fasten the battery module 120.

Though the unit cells 111 shown in FIG. 14 are connected in series, the unit cells 111 may be connected in parallel to increase the capacity of the battery pack. The assembled battery packs may be further connected in series or in parallel.

The battery pack of this embodiment is used as a power source for digital cameras and as vehicle batteries such as two- to four-wheel hybrid electric cars, two- to four-wheel electric cars and assist bicycles. The battery pack is preferably used for vehicle batteries. Further, the aspect of the battery pack can be adequately changed according to its application.

It is recommended that the battery pack is used under the condition where the upper limit and lower limit of the voltage is the one in the fully charged battery and fully discharged battery used to measure the above Q1 and Q2, and Q3 and Q4, respectively.

(Fourth Embodiment)

In a fourth embodiment, a vehicle comprises a nonaqueous electrolyte battery (unit cell) according to the first and/or second embodiments or with a battery pack according to the third embodiment as its motive force. Examples of the vehicles so-called here include two-wheel or four-wheel hybrid electric vehicles, two-wheel to four-wheel electric vehicles and assist bicycles.

Figure 18:
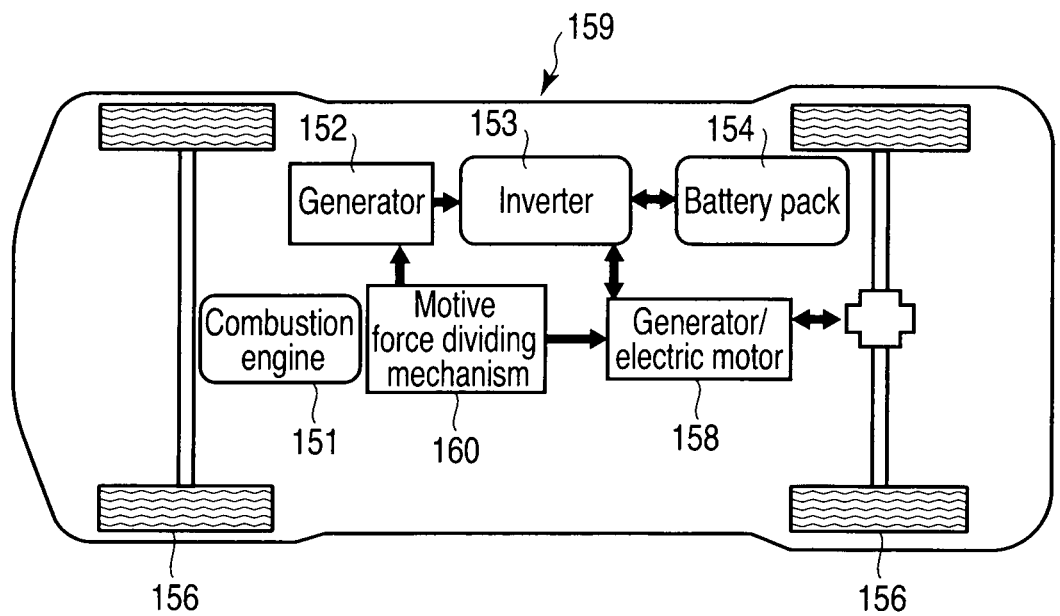
FIG. 18 is a schematic view showing a series-parallel hybrid vehicle according to the fourth embodiment.

FIGS. 16, 17, and 18 show a hybrid type vehicle utilizing a combination of an internal combustion engine and a battery-driven electric motor as the running power source. As the drive force of a vehicle, a power source enabling a wide range of rotations and torque is required corresponding to the running conditions of the vehicle. Generally, internal combustion engines are limited in torque/number of rotations at which ideal energy efficiency is obtained, and therefore the energy efficiency is reduced in the operating conditions other than the above specified condition. The hybrid type vehicles are characterized by the feature that the internal combustion engine is operated in the optimum condition to generate power, and also, the wheels are driven by a highly efficient electric motor, or the motive forces of the internal combustion engine and the electric motor are combined to drive, thereby making it possible to improve the energy efficiency of the entire vehicle. Further, the kinetic energy of the vehicle is recovered as electric power when the vehicle is decelerated, ensuring that the mileage per unit fuel can be increased more significantly than a usual vehicle driven only by an internal combustion engine.

The hybrid vehicles may be basically classified into three categories based on how an internal combustion engine and an electric motor are combined.

FIG. 16 shows a hybrid vehicle 150 generally called a series hybrid vehicle. The motive force of an internal combustion engine 151 is converted once into electric power by a generator 152 and this electric power is stored in a battery pack 154 through an inverter 153. As the battery pack 154, a battery pack according to the third embodiment is used. The electric power of the battery pack 154 is supplied to an electric motor 155 through an inverter 153 and a wheel 156 is driven by the electric motor 155. This is a system combining a generator in an electric vehicle. The internal combustion engine can be operated in a highly efficient condition and the power can be recovered. On the contrary, the wheel can be driven only by an electric motor and a high-output electric motor is therefore required. Further, as to the battery pack, one having a relatively large capacity is required. The rated capacity of the battery pack is desirably 5 to 50 Ah and more preferably 10 to 20 Ah. Here, the rated capacity means a capacity obtained when discharged at 0.2 C rate.

FIG. 17 shows a hybrid vehicle 157 called a parallel hybrid vehicle. The reference numeral 158 shows an electric motor doubling as a generator. An internal combustion engine 151 mainly drives a wheel 156 and a part of the motive force is optionally converted into electric power by the generator 158 and the battery pack 154 is charged by the electric power. When the vehicle is started or accelerated, which is accompanied by an increase in load, the drive force is supplemented by the electric motor 158. This is based on a usual vehicle and is a system which reduces variations in the load of the internal combustion engine 151, to thereby obtain high efficiency and also ensures power recovery. Because the wheel 156 is driven mainly by the internal combustion engine 151, the output of the electric motor 158 can be arbitrarily determined according to the ratio of the aid to the drive force. The system can be constituted even using a relatively small electric motor 158 and a battery pack 154. The rated capacity of the battery pack may be in a range from 1 to 20 Ah and more preferably 5 to 10 Ah.

FIG. 18 shows a hybrid vehicle 159 called a series-parallel hybrid vehicle. This is a system comprising a combination of series and parallel assemblies. A motive force dividing mechanism 160 divides the output of the internal combustion engine 151 into a generating use and a wheel-driving use. The engine load is controlled more carefully than in the case of a parallel system, thereby improving energy efficiency.

The rated capacity of the battery pack is desirably in a range from 1 to 20 Ah and more preferably in a range from 5 to 10 Ah.

The nominal voltage of a battery pack to be mounted on a hybrid vehicle as shown in FIGS. 16, 17, and 18 is desirably in a range from 200 to 600 V.

The battery pack according to the embodiment is particularly suitable for use in a series-parallel system hybrid vehicle.

Figure 19:
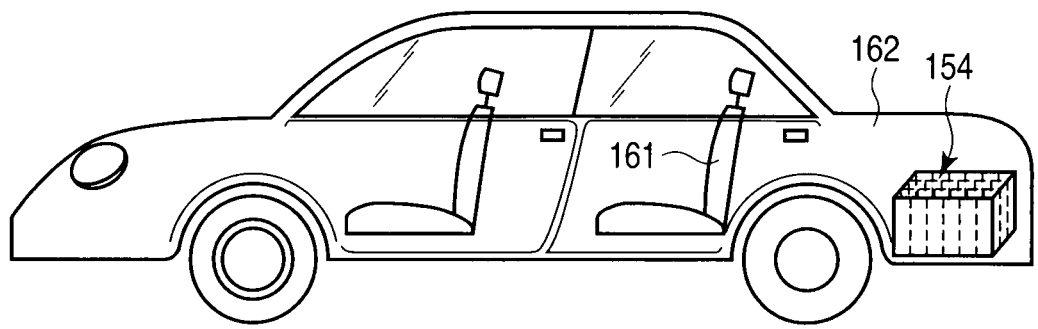
FIG. 19 is a schematic view of a vehicle according to the fourth embodiment.

The battery pack 154 is preferably disposed in a place where it is usually scarcely affected by the influence of a change in atmospheric temperature and by impacts of collisions and the like. In a sedan-type vehicle as shown in, for example, FIG. 19, the battery pack may be disposed in a trunk room 162 at the rear of the backseat 161. The battery pack may be disposed under or behind the seat 161. In the case where the battery has a large weight, it is preferable to dispose the battery pack under the seat or floor to lower the center of gravity of the whole vehicle.

An electric vehicle (EV) runs by the energy stored in the battery pack which is charged by supplying electric power from outside the vehicle. Accordingly, the electric vehicle can utilize electric energy generated efficiently by other generating equipment. Further, the kinetic energy of the vehicle can be recovered as electric power when the vehicle is decelerated. This ensures a high running efficiency. Because the electric vehicle does not emit any gas containing carbon dioxide, it is a clean vehicle. Further, because the motive force when the vehicle is run is produced by an electric motor, an electric motor having a high output is required. In general, it is necessary to store the energy required for one run in the battery pack by one charging prior to running. Accordingly, a battery having a very large capacity is required. The rated capacity of the battery pack is desirably 100 to 500 Ah and more preferably 200 to 400 Ah.

Further, the battery packs are preferably disposed at a low position and also a position not far from the center of gravity of the vehicle in such a manner that they are spread out under the floor because the ratio of the weight of these batteries to the weight of the vehicle is large. In order to charge a large quantity of electricity corresponding to one run in a short time, a charger and a charging cable having a large capacity are required. Therefore, the electric vehicle is desirably provided with a charge connector to connect the charger and charging cable. A non-contact system charging connector utilizing electromagnetic coupling may be used. A usual electric contact system connector may also be used as the charging connector.

EXAMPLES

Example 1

A positive electrode was manufactured using $LiMn_2O_4$ as a positive electrode active material. A negative electrode was manufactured using $Li_4Ti_5O_{12}$ as a negative electrode active material. A nonaqueous electrolyte battery was manufactured using the positive and negative electrodes. The negative electrode active material $Li_4Ti_5O_{12}$ can absorb and release lithium ions at 0.4 V (V.S. $Li/Li^+$) or more. The average of potentials of $Li_4Ti_5O_{12}$ at which lithium ions can be inserted and released is 1.55 V (V.S. $Li/Li^+$).

In detail, 90 wt % of a positive electrode active material, 8 wt % of acetylene black and 2 wt % of PVdF were mixed to prepare a positive electrode slurry. 70 g/m² of this positive electrode slurry was applied to an aluminum foil which was 20 μm in thickness such that the coating area was 95 m² and dried, followed by pressing to manufacture a positive electrode. The density of the positive electrode layer in the positive electrode was 2.7 g/cc.

90 wt % of a negative electrode active material, 8 wt % of graphite and 2 wt % of PVdF were mixed to prepare negative electrode slurry. 37.5 g/m² of this negative electrode slurry was applied to an aluminum foil which was 20 μm in thickness such that the coating area was 100 m² and dried, followed by pressing to manufacture a negative electrode. The density of the negative electrode layer in the negative electrode was 2.0 g/cc.

The manufactured positive electrode and negative electrode and a polypropylene separator were laminated and wounded into a flat shape to manufacture a wound electrode group. At this time, the electrode group was manufactured in such a manner that neither an unopposed part nor unopposed region existed in the positive electrode. In other words, the electrode group had a structure as shown by the developed view of FIG. 8B.

An electrolytic solution was prepared using 0.75 mol/l of $LiPF_6$ and 0.75 mol/l of $LiBF_4$ as the electrolyte, and propylene carbonate (PC) and diethyl carbonate (DEC) in a ratio by volume of 1:1 as the solvent. A battery of Example 1 was manufacture using the wound electrode group and the electrolytic solution.

In the battery of Example 1, the coating amounts and areas of the positive electrode slurry and negative electrode slurry, pressure of the press and the thicknesses of the positive electrode layer and negative electrode layer were adjusted in such a manner that Q2/Q1=10, Q4/Q3=10 and C/A=0.95, when the terminal voltages of charge and discharge of the battery were 2.9 V and 1.5 V, respectively.

Further, with regard to the battery of Example 1, the first cycle charge-discharge efficiency of the positive electrode was 98% and that of the negative electrode was 95%.

Examples 2 to 50

Using the positive electrode active materials and negative electrode active materials shown in Table 1 and the electrolytes and solvents for electrolyte solution shown in Table 2, batteries were manufactured in the same manner as in Example 1. However, the coating amounts and areas of the positive electrode slurry and negative electrode slurry, and the densities of the positive electrode layer and negative electrode layer were varied to adjust Q2/Q1, Q4/Q3 and C/A to desired values and to make the positive electrode into a desired form as to whether an unopposed region/unopposed part existed or not. The values of Q2/Q1, Q4/Q3 and C/A in each example are as described in Table 3. All of the negative electrode active materials used in Examples 1 to 50 are those capable of absorbing and releasing lithium ions at 0.4 V (V.S. $Li/Li^+$) or more. An average of the potentials of each active material at which lithium ions can be inserted and released is shown in Table 1. Further, in Example 50, C/A was 0.95 while the positive and negative electrode wound was made to shift in a wounding direction to form an unopposed region. Since this shift was not made in the batteries obtained in other Examples 1 to 49, no unopposed region of the positive electrode existed in these batteries.

Comparative Examples 1 to 7

The positive electrode active materials and negative electrode active materials shown in Table 1 and the electrolytes and electrolyte solvents shown in Table 2 were used to manufacture batteries in the same manner as in Example 1. In this case, the coating amounts and areas of the positive electrode slurry and negative electrode slurry, and the densities of the positive electrode layer and negative electrode layer were varied to adjust Q2/Q1, Q4/Q3 and C/A to desired values. The desired values of Q2/Q1, Q4/Q3 and C/A and the desired form as to whether an unopposed region/the positive electrode unopposed part exist or not are as shown in Table 3.

(Measurement of Q2/Q1 and Q4/Q3)

The values of Q2/Q1 and Q4/Q3 of each battery obtained in Examples 1 to 49 and Comparative Examples 1 to 7 were measured. For the measurement, a measuring cell 50 as shown in FIG. 20 was used. The measuring cell 50 is constituted of a working electrode 51 (positive or negative electrode to be subjected to measurement), a counter electrode 52 (for example, metal lithium), a reference electrode 53, a separator 54 and an electrolyte 55.

A positive electrode and a negative electrode were manufactured in the same manner as in Examples 1 to 50 and Comparative Examples 1 to 7 and the part where the positive and negative electrode were opposed to each other was cut into a square form 2 cm×2 cm in size. The positive electrode layer and negative electrode layer of one surface of the current collector was shaved because these layer was not used in measurement. The capacity of the sample obtained by such a way was measured. The value of the current at this time was a value obtained by multiplying a current value which is one-hour rate current per unit area of the opposed part in the formation of the battery, by the area (here, 4 cm²) of the electrode. Since the opposed parts of the positive and negative electrodes are the same, Q2/Q1 and Q4/Q3 can be calculated from the values measured using the square sample having a size of 2 cm×2 cm. As the electrolyte, the same electrolyte as that comprised in each battery obtained in Examples and Comparative Examples was used. As the separator, a polypropylene separator was used.

(Measurement of Capacity Maintenance Ratio)

Using each battery obtained in Examples 1 to 50 and Comparative Examples 1 to 7, 10000 cycles of charge-discharge operations were carried out in an environment of 50° C. to measure the capacity maintenance ratio of the battery after these charge-discharge operations. One cycle consisted of a constant-current and constant voltage charge up to a full charge voltage of 2.9 V, wherein the battery was charged under a 1 C current until the current was converged to 0.05 C, and a 1 C constant current discharge down to 1.5 V. The results are shown in Table 3.

It is shown from Table 3 that any of the batteries which use a negative electrode active material capable of charging and discharging at 0.4 V (v.s. Li/Li$^+$) or more and has a Q2/Q1 value of 1 or more and a C/A value of 0.5 or more and 0.999 or less has a high capacity maintenance ratio after 10000 cycles, showing that the battery has a long cycle life. Moreover, it is shown that these batteries each have a long cycle life in an environment of a temperature as high as 50° C.

Further, any of the batteries which use a negative electrode active material capable of charging and discharging at 0.4 V (v.s. Li/Li$^+$) or more and has a Q4/Q3 value of 1 or more and a C/A value of 0.5 or more and 0.999 or less has a high capacity maintenance ratio after 10000 cycles and exhibits a long cycle life. Further, these batteries also exhibit a long cycle life even in an environment of a temperature as high as 50° C.

Further, any of the batteries which use a negative electrode active material capable of charging and discharging at 0.4 V (v.s. Li/Li$^+$) or more and has a Q2/Q1 value of 1 or more and a Q4/Q3 value of 1 or more and a C/A value of 0.5 or more and 0.999 or less has a high capacity maintenance ratio in particular and has excellent cycle characteristics.

With regard to Comparative Examples 1 to 4, on the other hand, one or more of Q2/Q1, Q4/Q3 and C/A are out of the scope of the embodiments though a negative electrode active material capable of charging/discharging at 0.4 V (v.s. Li/Li$^+$) or more is used. These Comparative Examples 1 to 4 are decreased in the capacity maintenance ratio after 10000 cycles, showing that they each have a short cycle life. Comparative Example 4 having a Q2/Q1 value, a Q4/Q3 value and a C/A value which are all out of the scope of the embodiments is especially decreased in capacity maintenance ratio. Comparative Examples 5 to 7 respectively use as the negative electrode active material, graphite capable of charging and discharging at 0.01 V (v.s. Li/Li$^+$) or more and are therefore decreased in capacity maintenance ratio.

TABLE 1

| | Positive electrode active material | Negative electrode active material | Average potential* (vsLi) |
|---|---|---|---|
| Example 1 | $LiMn_2O_4$ | $Li_4Ti_5O_{12}$ | 1.55 |
| Example 2 | $LiMn_2O_4$ | FeS | 1.3 |
| Example 3 | $LiMn_2O_4$ | $FeS_2$ | 1.3 |
| Example 4 | $LiMn_2O_4$ | $LiTi_2O_7$ | 1.5 |
| Example 5 | $LiMn_2O_4$ | $TiO_2$ | 1.6 |
| Example 6 | $LiMn_2O_4$ | $Li_4Ti_5O_{12}$ | 1.55 |
| Example 7 | $LiMn_2O_4$ | $Li_4Ti_5O_{12}$ | 1.55 |
| Example 8 | $LiFePO_4$ | $Li_4Ti_5O_{12}$ | 1.55 |
| Example 9 | $LiNi_{0.5}Mn_{1.5}O_4$ | $Li_4Ti_5O_{12}$ | 1.55 |
| Example 10 | $LiMn_2O_4$ | $Li_4Ti_5O_{12}$ | 1.55 |
| Example 11 | $LiMn_2O_4$ | $Li_4Ti_5O_{12}$ | 1.55 |
| Example 12 | $LiMn_2O_4$ | $Li_4Ti_5O_{12}$ | 1.55 |
| Example 13 | $LiMn_2O_4$ | $Li_4Ti_5O_{12}$ | 1.55 |
| Example 14 | $LiMn_2O_4$ | $Li_4Ti_5O_{12}$ | 1.55 |
| Example 15 | $LiNi_{0.8}Co_{0.15}Al_{0.05}O_2$ | $Li_4Ti_5O_{12}$ | 1.55 |
| Example 16 | $LiNi_{0.8}Co_{0.15}Al_{0.05}O_2$ | $Li_4Ti_5O_{12}$ | 1.55 |
| Example 17 | $LiNi_{0.8}Co_{0.15}Al_{0.05}O_2$ | $Li_4Ti_5O_{12}$ | 1.55 |
| Example 18 | $LiNi_{0.8}Co_{0.15}Al_{0.05}O_2$ | $Li_4Ti_5O_{12}$ | 1.55 |
| Example 19 | $LiCoO_2$ | $Li_4Ti_5O_{12}$ | 1.55 |
| Example 20 | $LiCoO_2$ | $Li_4Ti_5O_{12}$ | 1.55 |
| Example 21 | $LiCoO_2$ | $Li_4Ti_5O_{12}$ | 1.55 |
| Example 22 | $LiCoO_2$ | $Li_4Ti_5O_{12}$ | 1.55 |
| Example 23 | $LiNi_{0.33}Co_{0.33}Mn_{0.34}O_2$ | $Li_4Ti_5O_{12}$ | 1.55 |
| Example 24 | $LiNi_{0.33}Co_{0.33}Mn_{0.34}O_2$ | $Li_4Ti_5O_{12}$ | 1.55 |
| Example 25 | $LiNi_{0.33}Co_{0.33}Mn_{0.34}O_2$ | $Li_4Ti_5O_{12}$ | 1.55 |
| Example 26 | $LiNi_{0.33}Co_{0.33}Mn_{0.34}O_2$ | $Li_4Ti_5O_{12}$ | 1.55 |
| Example 27 | $LiNi_{0.33}Co_{0.33}Mn_{0.34}O_2$ | $Li_4Ti_5O_{12}$ | 1.55 |
| Example 28 | $LiNi_{0.33}Co_{0.33}Mn_{0.34}O_2$ | $Li_4Ti_5O_{12}$ | 1.55 |
| Example 29 | $LiNi_{0.33}Co_{0.33}Mn_{0.34}O_2$ | $Li_4Ti_5O_{12}$ | 1.55 |
| Example 30 | $LiNi_{0.33}Co_{0.33}Mn_{0.34}O_2$ | $Li_4Ti_5O_{12}$ | 1.55 |
| Example 31 | $LiNi_{0.33}Co_{0.33}Mn_{0.34}O_2$ | $Li_4Ti_5O_{12}$ | 1.55 |
| Example 32 | $LiNi_{0.33}Co_{0.33}Mn_{0.34}O_2$ | $Li_4Ti_5O_{12}$ | 1.55 |
| Example 33 | $LiMn_2O_4$ | $Li_4Ti_5O_{12}$ | 1.55 |
| Example 34 | $LiMn_2O_4$ | $Li_4Ti_5O_{12}$ | 1.55 |
| Example 35 | $LiMn_2O_4$ | $Li_4Ti_5O_{12}$ | 1.55 |
| Example 36 | $LiMn_2O_4$ | $Li_4Ti_5O_{12}$ | 1.55 |
| Example 37 | $LiMn_2O_4$ | $Li_4Ti_5O_{12}$ | 1.55 |
| Example 38 | $LiMn_2O_4$ | $Li_4Ti_5O_{12}$ | 1.55 |
| Example 39 | $LiMn_2O_4$ | $Li_4Ti_5O_{12}$ | 1.55 |
| Example 40 | $LiMn_2O_4$ | $Li_4Ti_5O_{12}$ | 1.55 |
| Example 41 | $LiMn_2O_4$ | $Li_4Ti_5O_{12}$ | 1.55 |
| Example 42 | $LiMn_2O_4$ | $Li_4Ti_5O_{12}$ | 1.55 |
| Example 43 | $LiMn_2O_4$ | $Li_4Ti_5O_{12}$ | 1.55 |
| Example 44 | $LiMn_2O_4$ | $Li_4Ti_5O_{12}$ | 1.55 |
| Example 45 | $LiMn_2O_4$ | $Li_4Ti_5O_{12}$ | 1.55 |
| Example 46 | $LiMn_2O_4$ | $Li_4Ti_5O_{12}$ | 1.55 |
| Example 47 | $LiMn_2O_4$ | $Li_4Ti_5O_{12}$ | 1.55 |
| Example 48 | $LiMn_2O_4$ | $Li_4Ti_5O_{12}$ | 1.55 |
| Example 49 | $LiMn_2O_4$ | $Li_4Ti_5O_{12}$ | 1.55 |
| Example 50 | $LiMn_2O_4$ | $Li_4Ti_5O_{12}$ | 1.55 |
| Comparative Example 1 | $LiMn_2O_4$ | $Li_4Ti_5O_{12}$ | 1.55 |
| Comparative Example 2 | $LiMn_2O_4$ | $Li_4Ti_5O_{12}$ | 1.55 |
| Comparative Example 3 | $LiMn_2O_4$ | $Li_4Ti_5O_{12}$ | 1.55 |
| Comparative Example 4 | $LiMn_2O_4$ | $Li_4Ti_5O_{12}$ | 1.55 |
| Comparative Example 5 | $LiMn_2O_4$ | Graphite | 0.01 |
| Comparative Example 6 | $LiMn_2O_4$ | Graphite | 0.01 |
| Comparative Example 7 | $LiMn_2O_4$ | Graphite | 0.01 |

*An average of the potentials of each negative electrode active material at which lithium ions can be inserted and released.

TABLE 2

| | Electrolyte | Solvent for electrolytic solution |
|---|---|---|
| Example 1 | $LiPF_6$ 0.75 mol/l $LiBF_4$ 0.75mol/l | PC:DEC = 1:1 vol. |
| Example 2 | $LiPF_6$ 0.75 mol/l $LiBF_4$ 0.75mol/l | PC:DEC = 1:1 vol. |
| Example 3 | $LiPF_6$ 0.75 mol/l $LiBF_4$ 0.75mol/l | PC:DEC = 1:1 vol. |
| Example 4 | $LiPF_6$ 0.75 mol/l $LiBF_4$ 0.75mol/l | PC:DEC = 1:1 vol. |
| Example 5 | $LiPF_6$ 0.75 mol/l $LiBF_4$ 0.75mol/l | PC:DEC = 1:1 vol. |
| Example 6 | $LiPF_6$ 0.75 mol/l $LiBF_4$ 0.75mol/l | PC:DEC = 1:1 vol. |
| Example 7 | $LiPF_6$ 0.75 mol/l $LiBF_4$ 0.75mol/l | PC:DEC = 1:1 vol. |
| Example 8 | $LiPF_6$ 0.75 mol/l $LiBF_4$ 0.75mol/l | PC:DEC = 1:1 vol. |
| Example 9 | $LiPF_6$ 0.75 mol/l $LiBF_4$ 0.75mol/l | PC:DEC = 1:1 vol. |
| Example 10 | $LiPF_6$ 0.75 mol/l $LiBF_4$ 0.75mol/l | PC:DEC = 1:1 vol. |
| Example 11 | $LiPF_6$ 0.75 mol/l $LiBF_4$ 0.75mol/l | PC:DEC = 1:1 vol. |
| Example 12 | $LiPF_6$ 0.75 mol/l $LiBF_4$ 0.75mol/l | PC:DEC = 1:1 vol. |
| Example 13 | $LiPF_6$ 0.75 mol/l $LiBF_4$ 0.75mol/l | PC:DEC = 1:1 vol. |
| Example 14 | $LiPF_6$ 0.75 mol/l $LiBF_4$ 0.75mol/l | PC:DEC = 1:1 vol. |
| Example 15 | $LiPF_6$ 0.75 mol/l $LiBF_4$ 0.75mol/l | PC:DEC = 1:1 vol. |
| Example 16 | $LiPF_6$ 0.75 mol/l $LiBF_4$ 0.75mol/l | PC:DEC = 1:1 vol. |
| Example 17 | $LiPF_6$ 0.75 mol/l $LiBF_4$ 0.75mol/l | PC:DEC = 1:1 vol. |
| Example 18 | $LiPF_6$ 0.75 mol/l $LiBF_4$ 0.75mol/l | PC:DEC = 1:1 vol. |
| Example 19 | $LiPF_6$ 0.75 mol/l $LiBF_4$ 0.75mol/l | PC:DEC = 1:1 vol. |
| Example 20 | $LiPF_6$ 0.75 mol/l $LiBF_4$ 0.75mol/l | PC:DEC = 1:1 vol. |
| Example 21 | $LiPF_6$ 0.75 mol/l $LiBF_4$ 0.75mol/l | PC:DEC = 1:1 vol. |
| Example 22 | $LiPF_6$ 0.75 mol/l $LiBF_4$ 0.75mol/l | PC:DEC = 1:1 vol. |
| Example 23 | $LiPF_6$ 0.37 mol/l $LiBF_4$ 0.63mol/l | PC:DEC = 1:1 vol. |
| Example 24 | $LiPF_6$ 0.63 mol/l $LiBF_4$ 0.37mol/l | PC:DEC = 1:1 vol. |
| Example 25 | $LiPF_6$ 0.67 mol/l $LiBF_4$ 1.33mol/l | PC:DEC = 1:1 vol. |

TABLE 2-continued

|  | Electrolyte | Solvent for electrolytic solution |
|---|---|---|
| Example 26 | LiPF$_6$ 1.33 mol/l LiBF$_4$ 0.67mol/l | PC:DEC = 1:1 vol. |
| Example 27 | LiPF$_6$ 0.17 mol/l LiBF$_4$ 0.33mol/l | PC:DEC = 1:1 vol. |
| Example 28 | LiPF$_6$ 0.33 mol/l LiBF$_4$ 0.17mol/l | PC:DEC = 1:1 vol. |
| Example 29 | LiPF$_6$ 1.0 mol/l | PC:DEC = 1:1 vol. |
| Example 30 | LiPF$_6$ 1.7 mol/l | PC:DEC = 1:1 vol. |
| Example 31 | LiPF$_6$ 0.5 mol/l | PC:DEC = 1:1 vol. |
| Example 32 | LiPF$_6$ 2.0 mol/l | PC:DEC = 1:1 vol. |
| Example 33 | LiPF$_6$ 0.75 mol/l LiBF$_4$ 0.75mol/l | PC |
| Example 34 | LiPF$_6$ 0.75 mol/l LiBF$_4$ 0.75mol/l | EC:DEC = 1:1 vol. |
| Example 35 | LiPF$_6$ 0.75 mol/l LiBF$_4$ 0.75mol/l | PC:MEC = 1:1 vol. |
| Example 36 | LiPF$_6$ 0.75 mol/l LiBF$_4$ 0.75mol/l | EC:MEC = 1:1 vol. |
| Example 37 | LiPF$_6$ 0.75 mol/l LiBF$_4$ 0.75mol/l | PC:DEC = 1:1 vol. |
| Example 38 | LiPF$_6$ 0.75 mol/l LiBF$_4$ 0.75mol/l | PC:DEC = 1:1 vol. |
| Example 39 | LiPF$_6$ 0.75 mol/l LiBF$_4$ 0.75mol/l | PC:DEC = 1:1 vol. |
| Example 40 | LiPF$_6$ 0.75 mol/l LiBF$_4$ 0.75mol/l | PC:DEC = 1:1 vol. |
| Example 41 | LiPF$_6$ 0.75 mol/l LiBF$_4$ 0.75mol/l | PC:DEC = 1:1 vol. |
| Example 42 | LiPF$_6$ 0.75 mol/l LiBF$_4$ 0.75mol/l | PC:DEC = 1:1 vol. |
| Example 43 | LiPF$_6$ 0.75 mol/l LiBF$_4$ 0.75mol/l | PC:DEC = 1:1 vol. |
| Example 44 | LiPF$_6$ 0.75 mol/l LiBF$_4$ 0.75mol/l | PC:DEC = 1:1 vol. |
| Example 45 | LiPF$_6$ 0.75 mol/l LiBF$_4$ 0.75mol/l | PC:DEC = 1:1 vol. |
| Example 46 | LiPF$_6$ 0.75 mol/l LiBF$_4$ 0.75mol/l | PC:DEC = 1:1 vol. |
| Example 47 | LiPF$_6$ 0.75 mol/l LiBF$_4$ 0.75mol/l | PC:DEC = 1:1 vol. |
| Example 48 | LiPF$_6$ 0.75 mol/l LiBF$_4$ 0.75mol/l | PC:DEC = 1:1 vol. |
| Example 49 | LiPF$_6$ 0.75 mol/l LiBF$_4$ 0.75mol/l | PC:DEC = 1:1 vol. |
| Example 50 | LiPF$_6$ 0.75 mol/l LiBF$_4$ 0.75mol/l | PC:DEC = 1:1 vol. |
| Comparative Example 1 | LiPF$_6$ 0.75 mol/l LiBF$_4$ 0.75mol/l | PC:DEC = 1:1 vol. |
| Comparative Example 2 | LiPF$_6$ 0.75 mol/l LiBF$_4$ 0.75mol/l | PC:DEC = 1:1 vol. |
| Comparative Example 3 | LiPF$_6$ 0.75 mol/l LiBF$_4$ 0.75mol/l | PC:DEC = 1:1 vol. |
| Comparative Example 4 | LiPF$_6$ 0.75 mol/l LiBF$_4$ 0.75mol/l | PC:DEC = 1:1 vol. |
| Comparative Example 5 | LiPF$_6$ 0.75 mol/l LiBF$_4$ 0.75mol/l | PC:DEC = 1:1 vol. |
| Comparative Example 6 | LiPF$_6$ 0.75 mol/l LiBF$_4$ 0.75mol/l | PC:DEC = 1:1 vol. |
| Comparative Example 7 | LiPF$_6$ 1.5 mol/l | EC/MEC |

TABLE 3

|  | Q2/Q1 | Q4/Q3 | C/A | Capacity maintenance ratio after 10000 cycles at 50° C. | Existence of the unopposed region of the positive electrode |
|---|---|---|---|---|---|
| Example 1 | 10 | 10 | 0.95 | 99% | None |
| Example 2 | 10 | 10 | 0.95 | 95% | None |
| Example 3 | 10 | 10 | 0.95 | 94% | None |
| Example 4 | 10 | 10 | 0.95 | 95% | None |
| Example 5 | 10 | 10 | 0.95 | 95% | None |
| Example 6 | 10000 | 10000 | 0.95 | 99% | None |
| Example 7 | ∞ | ∞ | 0.95 | 99% | None |
| Example 8 | ∞ | ∞ | 0.95 | 99% | None |
| Example 9 | ∞ | ∞ | 0.95 | 99% | None |
| Example 10 | ∞ | ∞ | 0.988 | 99% | None |
| Example 11 | ∞ | ∞ | 0.85 | 96% | None |
| Example 12 | ∞ | ∞ | 0.99 | 96% | None |
| Example 13 | ∞ | ∞ | 0.5 | 92% | None |
| Example 14 | ∞ | ∞ | 0.999 | 92% | None |
| Example 15 | 1 | ∞ | 0.988 | 90% | None |
| Example 16 | 2 | ∞ | 0.988 | 93% | None |
| Example 17 | 5 | ∞ | 0.988 | 95% | None |
| Example 18 | 10 | ∞ | 0.988 | 99% | None |
| Example 19 | 5 | 1 | 0.988 | 90% | None |
| Example 20 | 5 | 2 | 0.988 | 93% | None |
| Example 21 | 5 | 5 | 0.988 | 95% | None |
| Example 22 | 5 | 10 | 0.988 | 99% | None |
| Example 23 | 5 | 5 | 0.988 | 98% | None |
| Example 24 | 5 | 5 | 0.988 | 98% | None |
| Example 25 | 5 | 5 | 0.988 | 98% | None |
| Example 26 | 5 | 5 | 0.988 | 98% | None |
| Example 27 | 5 | 5 | 0.988 | 93% | None |
| Example 28 | 5 | 5 | 0.988 | 93% | None |
| Example 29 | 5 | 5 | 0.988 | 90% | None |
| Example 30 | 5 | 5 | 0.988 | 90% | None |
| Example 31 | 5 | 5 | 0.988 | 88% | None |
| Example 32 | 5 | 5 | 0.988 | 88% | None |
| Example 33 | 5 | 5 | 0.988 | 97% | None |
| Example 34 | 5 | 5 | 0.988 | 85% | None |
| Example 35 | 5 | 5 | 0.988 | 85% | None |
| Example 36 | 5 | 5 | 0.988 | 82% | None |
| Example 37 | 1 | 0.9 | 0.5 | 82% | None |
| Example 38 | 1 | 0.9 | 0.95 | 99% | None |
| Example 39 | 2 | 0.9 | 0.95 | 70% | None |
| Example 40 | 5 | 0.9 | 0.95 | 72% | None |
| Example 41 | 10 | 0.9 | 0.95 | 75% | None |
| Example 42 | 100000 | 0.9 | 0.95 | 77% | None |
| Example 43 | ∞ | 0.9 | 0.95 | 77% | None |
| Example 44 | 0.9 | 1 | 0.95 | 70% | None |
| Example 46 | 0.9 | 5 | 0.95 | 75% | None |
| Example 47 | 0.9 | 10 | 0.95 | 77% | None |
| Example 48 | 0.9 | 100000 | 0.95 | 77% | None |
| Example 49 | 0.9 | ∞ | 0.95 | 77% | None |
| Example 50 | 10 | 10 | 0.95 | 72% | Exists |
| Comparative Example 1 | 0.9 | 0.9 | 0.5 | 50% | None |
| Comparative Example 2 | 1 | 1 | 1 | 45% | None |
| Comparative Example 3 | 1 | 1 | 0.45 | 32% | None |
| Comparative Example 4 | 0.9 | 0.9 | 0.45 | 25% | None |
| Comparative Example 5 | 1 | 1 | 0.5 | 52% | None |
| Comparative Example 6 | 0.9 | 0.9 | 1.1 | Short circuit is occurred in 4000th cycle | Exists |
| Comparative Example 7 | 0.9 | 0.9 | 0.5 | 55% | None |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
   a positive electrode comprising a positive electrode current collector and a positive electrode layer formed on at least one surface of the positive electrode current collector;
   a negative electrode comprising a negative electrode current collector and a negative electrode layer formed on at least one surface of the negative electrode current collector;
   a separator interposed between the positive electrode and the negative electrode; and
   a nonaqueous electrolyte solution consisting of an organic solvent and an electrolyte, said organic solvent including at least one solvent selected from the group consisting of ethylene carbonate (EC), propylene carbonate (PC), gamma butyrolactone (γ-BL), diethyl carbonate (DEC), ethylmethyl carbonate (EMC) and dimethyl carbonate (DMC), said electrolyte including at least one salt selected from the group consisting of $LiPF_6$ and $LiBF_4$, wherein the positive electrode comprises a positive electrode active material, the positive electrode active material including at least one composite oxide selected from the group consisting of $LiMn_{2-x}M_xO_4$, $LiCo_{1-y}M_yO_2$, $LiNi_{0.5-z}Mn_{1.5-a}$ $_5M_{z+a}O$ $_4$, $LiMPO_4$ and $LiFe_{1-y}M_yPO_4$, where $0 \le x < 2$, $0 \le y < 1$, $0 \le z < 0.5$, $0 \le a < 1.5$, and M is a metal or a transition metal, the negative electrode layer comprises a negative electrode active material which can absorb and release lithium ions at a negative electrode potential of 0.4 V (V.S. Li/Li+) or more, the nonaqueous electrolyte battery satisfying the following equations (I) and (II):

$$1 \le Q2/Q1 \le 10 \qquad (I)$$

$$0.5 \le C/A \le 0.999 \qquad (II)$$

wherein the negative electrode layer has a negative electrode opposed part opposed to the positive electrode through the separator, and the positive electrode layer has a positive electrode opposed part opposed to the negative electrode through the separator, Q1 is a difference between a capacity at the negative electrode opposed part which is fully charged and an end capacity at the negative electrode opposed part which has thereto applied a potential shifted to a reducing side by 0.05 V from an open circuit voltage OCV1 between the negative electrode opposed part and metal lithium, Q2 is a difference between a capacity at the positive electrode opposed part which is fully charged and an end capacity at the positive electrode opposed part which has thereto applied a potential shifted to an oxidizing side by 0.05 V from an open circuit voltage OCV2 between the positive electrode opposed part and metal lithium, A is an area of an opposed region comprising the negative electrode opposed part and unopposed part of the negative electrode layer, and C is an area of an opposed region comprising the positive electrode opposed part and unopposed part of the positive electrode layer.

2. The battery according to claim 1, wherein the entire positive electrode layer comprises the positive electrode opposed part.

3. The battery according to claim 1, wherein Q2/Q1 is 5 or more.

4. The battery according to claim 1, wherein $LiPF_6$ is comprised in the nonaqueous electrolyte.

5. The battery according to claim 4, wherein the $LiPF_6$ is comprised in a concentration falling within a range of 0.01 mol/L to 2 mol/L.

6. The battery according to claim 1, wherein the negative electrode active material comprises lithium titanate having a spinel structure.

7. The battery according to claim 6, wherein the positive electrode active material comprises at least one composite oxide selected from the group consisting of $LiMn_{2-x}M_xO_4$ and $LiCo_{1-y}M_yO_2$, where $0 \le x < 2$, $0 \le y < 1$, and M is a metal or a transition metal.

8. The battery according to claim 1, wherein the positive electrode has a higher first cycle charge-discharge efficiency than the negative electrode.

9. A battery pack comprising the battery according to claim 1.

10. A vehicle comprising the battery pack according to claim 9.

11. A nonaqueous electrolyte battery comprising:

a positive electrode comprising a positive electrode current collector and a positive electrode layer formed on at least one surface of the positive electrode current collector;

a negative electrode comprising a negative electrode current collector and a negative electrode layer formed on at least one surface of the negative electrode current collector;

a separator interposed between the positive electrode and the negative electrode; and a nonaqueous electrolyte solution consisting of an organic solvent and an electrolyte, said organic solvent including at least one solvent selected from the group consisting of ethylene carbonate (EC), propylene carbonate (PC), gamma butyrolactone (γ-BL), diethyl carbonate (DEC), ethylmethyl carbonate (EMC) and dimethyl carbonate (DMC), said electrolyte including at least one salt selected from the group consisting of $LiPF_6$ and $LiBF_4$, wherein the positive electrode comprises a positive electrode active material, the positive electrode active material including at least one composite oxide selected from the group consisting of $LiMn_{2-x}M_xO_4$, $LiCo_{1-y}M_yO_2$, $LiNi_{0.5-z}M_{z+a}O_4$, $LiMPO_4$ and $LiFe_{1-y}M_yPO_4$, where $0 \le x < 2$, $0 \le y < 1$, $0 \le z < 0.5$, $0 \le a < 1.5$, and M is a metal or a transition metal, the negative electrode layer comprises a negative electrode active material which can absorb and release lithium ions at a negative electrode potential of 0.4 V (V.S. Li/Li+) or more, the nonaqueous electrolyte battery satisfying the following equations (III) and (IV):

$$1 \le Q4/Q3 \le 10 \qquad (III)$$

$$0.5 < C/A < 0.999 \qquad (IV)$$

wherein the negative electrode layer has a negative electrode opposed part opposed to the positive electrode through the separator, and the positive electrode layer has a positive electrode opposed part opposed to the negative electrode through the separator, Q3 is a difference between a capacity at the negative electrode opposed part which is fully discharged and an end capacity at the negative electrode opposed part which has applied thereto a potential shifted to an oxidizing side by 0.05 V from an open circuit voltage OCV3 between the negative electrode opposed part and metal lithium, Q4 is a difference between a capacity at the positive electrode opposed part which is fully discharged and an end capacity at the positive electrode opposed part which has applied thereto a potential shifted to a reducing side by 0.05 V from an open circuit voltage OCV4 between the positive electrode opposed part and metal lithium, A is an area of a opposed region comprising the negative electrode opposed part and unopposed part of the negative electrode layer, and C is an area of an opposed region comprising the positive electrode opposed part and unopposed part of the positive electrode layer.

12. The battery according to claim 11, wherein the entire positive electrode layer comprises the positive electrode opposed part.

13. The battery according to claim 11, wherein Q4/Q3 is 5 or more.

14. The battery according to claim 11, wherein $LiPF_6$ is comprised in the nonaqueous electrolyte.

15. The battery according to claim 14, wherein the $LiPF_6$ is comprised in a concentration falling within a range of 0.01 mol/L to 2 mol/L.

16. The battery according to claim 11, wherein the negative electrode active material comprises lithium titanate having a spinel structure.

17. The battery according to claim 11, wherein the positive electrode active material comprises at least one composite oxide selected from the group consisting of $LiMn_{2-x}M_xO_4$ and $LiCo_{1-y}M_yO_2$, $LiNi_{1-y}M_yO_2$, where $0 \leq x < 2$, $0 \leq y < 1$, and M is a metal or a transition metal.

18. The battery according to claim 11, wherein the positive electrode has a higher first cycle charge-discharge efficiency than the negative electrode.

19. A battery pack comprising the battery according to claim 11.

20. A vehicle comprising the battery pack according to claim 19.

* * * * *